(12) United States Patent
Hakkaku et al.

(10) Patent No.: US 11,639,030 B2
(45) Date of Patent: May 2, 2023

(54) MANUFACTURING METHOD AND SHAPING DEVICE FOR SHAPED OBJECT

(71) Applicant: MIMAKI ENGINEERING CO., LTD., Nagano (JP)

(72) Inventors: Kunio Hakkaku, Nagano (JP); Yoshikazu Furukawa, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 351 days.

(21) Appl. No.: 15/884,382

(22) Filed: Jan. 31, 2018

(65) Prior Publication Data
US 2018/0222120 A1 Aug. 9, 2018

(30) Foreign Application Priority Data

Feb. 3, 2017 (JP) .............................. JP2017-018418
Jun. 16, 2017 (JP) .............................. JP2017-118531

(51) Int. Cl.
*B29C 64/393* (2017.01)
*B29C 64/112* (2017.01)
(Continued)

(52) U.S. Cl.
CPC .......... *B29C 64/393* (2017.08); *B29C 64/112* (2017.08); *B33Y 10/00* (2014.12);
(Continued)

(58) Field of Classification Search
CPC .................................................. B29C 64/393
See application file for complete search history.

(56) References Cited

U.S. PATENT DOCUMENTS 2,229,170 A * 1/1941 Greene ................. B29C 66/532
473/354
3,124,626 A * 3/1964 Graham .................... B63B 5/24
264/46.7
(Continued)

FOREIGN PATENT DOCUMENTS

JP H0623854 2/1994
JP 2013043409 3/2013
(Continued)

OTHER PUBLICATIONS

Machine Translation JP2016002714A (Year: 2016).*
(Continued)

*Primary Examiner* — Matthew J Daniels
*Assistant Examiner* — Wayne K. Swier
(74) *Attorney, Agent, or Firm* — JCIPRNET

(57) ABSTRACT

To manufacture a shaped object more appropriately by adjusting weight and the like of the shaped object. A manufacturing method for a shaped object for manufacturing a three-dimensional shaped object by depositing a layer of shaping material, the manufacturing method includes: setting a weight of at least part of the shaped object to be a setting weight different from a filling weight that is weight in a case of forming the shaped object by filling deposition material used for deposition; and forming the shaped object to which the setting weight is set to be matched with the setting weight by forming at least part of the shaped object in a state of including a clearance inside as a region that is not formed with the deposition material.

4 Claims, 10 Drawing Sheets

(51) Int. Cl.
  *B33Y 30/00* (2015.01)
  *B33Y 50/02* (2015.01)
  *B33Y 10/00* (2015.01)
(52) U.S. Cl.
  CPC ............... *B33Y 30/00* (2014.12); *B33Y 50/02* (2014.12); *B29K 2995/0063* (2013.01)

(56) References Cited

U.S. PATENT DOCUMENTS

| | | | | |
|---|---|---|---|---|
| 4,752,352 | A * | 6/1988 | Feygin | B22F 10/20 29/430 |
| 5,015,424 | A * | 5/1991 | Smalley | B29C 64/135 264/401 |
| 5,573,721 | A * | 11/1996 | Gillette | B33Y 10/00 118/712 |
| 6,508,971 | B2 * | 1/2003 | Leyden | B29C 41/12 264/401 |
| 6,607,689 | B1 * | 8/2003 | Farnworth | B33Y 40/20 425/375 |
| 6,623,838 | B1 * | 9/2003 | Nomura | B29C 45/1705 428/167 |
| 10,137,642 | B1 * | 11/2018 | Gifford | B22F 10/20 |
| 2013/0053995 | A1 * | 2/2013 | Hashimoto | B29C 64/153 700/97 |
| 2014/0121813 | A1 * | 5/2014 | Schmehl | B29C 48/92 700/119 |
| 2016/0297147 | A1 * | 10/2016 | Osawa | B29C 64/386 |
| 2017/0184086 | A1 * | 6/2017 | Scancarello | F04C 18/0215 |
| 2018/0111313 | A1 * | 4/2018 | Murao | B29C 64/118 |

FOREIGN PATENT DOCUMENTS

| | | |
|---|---|---|
| JP | 2013086289 | 5/2013 |
| JP | 2014151524 | 8/2014 |
| JP | 2015071282 | 4/2015 |
| JP | 2015180537 | 10/2015 |
| JP | 2016002714 | 1/2016 |
| JP | 2016002714 A * | 1/2016 |

OTHER PUBLICATIONS

Office Action of Japan Counterpart Application, with English translation thereof, dated Jan. 26, 2021, pp. 1-12.

"Notification of Reasons for Rejection of Japan Counterpart Application", dated Jul. 26, 2022, with English translation thereof, p. 1-p. 13.

* cited by examiner

MANUFACTURING METHOD AND SHAPING DEVICE FOR SHAPED OBJECT

CROSS REFERENCE TO RELATED APPLICATIONS

This application claims the priority benefit of Japanese Patent Application No. 2017-018418, filed on Feb. 3, 2017, and Japanese Patent Application No. 2017-118531, filed on Jun. 16, 2017. The entirety of the above-mentioned patent application is hereby incorporated by reference herein and made a part of this specification.

TECHNICAL FIELD

The present disclosure relates to a manufacturing method and a shaping device for a shaped object.

BACKGROUND ART

In the related art, there is known a shaping device (3D printer) that shapes a shaped object by using an ink-jet head (for example, refer to Japanese Patent Application Laid-open No. 2015-71282). For example, such a shaping device shapes a shaped object using a deposition shaping method by depositing a plurality of layers of ink formed by the ink-jet head.

Patent Literature: Japanese Patent Application Laid-open No. 2015-71282

SUMMARY

In a case of shaping a shaped object with a shaping device, the weight of the shaped object is determined in accordance with the specific gravity of deposition material to be deposited in a shaping process and a size of the shaped object. However, depending on the use and the like of the shaped object, the weight of the shaped object is desired to be heavier or lighter in some cases. For example, depending on the shape of the shaped object, weight balance may be lost when the shaping is simply performed in some cases. In such a case, the center of gravity of the shaped object may be desired to be adjusted. Thus, in the related art, there has been a demand for manufacturing the shaped object using a more appropriate method. The present disclosure provides a manufacturing method and a shaping device for the shaped object that can solve the above problem.

The inventors of the present disclosure originate an idea of adjusting the weight, the center of gravity, and the like by providing a clearance (cavity) inside instead of directly forming the shape of the shaped object in shaping the shaped object. With this configuration, for example, the weight, the center of gravity, and the like of the shaped object can be appropriately formed without affecting an external appearance of the shaped object. The inventors have found a characteristic required for obtaining such an effect as a result of intensive research to complete the present disclosure.

To solve the problem described above, the present disclosure provides a manufacturing method for a shaped object for manufacturing a three-dimensional shaped object by depositing layers of shaping material, the method is performed such that a weight of at least part of the shaped object is set to be a setting weight different from a filling weight that is the weight in a case of forming the shaped object by filling with deposition material used for deposition, and at least part of the shaped object to which the setting weight is set is formed in a state of having a clearance inside as a region that is not formed with the deposition material to form the shaped object in accordance with the setting weight.

With this configuration, for example, the weight of the shaped object can be appropriately adjusted to be desired weight. In this case, by adjusting a position and the like at which the clearance is formed in the shaped object, for example, the center of gravity of the shaped object can be adjusted. Thus, with this configuration, for example, the weight and the center of gravity of the shaped object can be caused to be closer to a desired state. Accordingly, for example, the shaped object can be more appropriately manufactured.

In this configuration, at the time of setting the setting weight, for example, an instruction for the center of gravity may also be received from a manipulator, the instruction designating a direction of the center of gravity of the shaped object. In this case, for example, the direction of the center of gravity of the shaped object is preferably set based on the instruction for the center of gravity. Setting the direction of the center of gravity of the shaped object means, for example, that the shaped object is shaped so that orientation of the center of gravity of the shaped object is identical to the instruction for the center of gravity.

In this configuration, for example, the shaped object may be formed in a state of including a plurality of clearances inside. With this configuration, for example, the weight and the center of gravity of the shaped object can be more appropriately formed. For example, a substance having a specific gravity different from that of the deposition material may be put into the clearance. In this case, for example, a substance having a specific gravity larger than that of the deposition material may be put into the clearance. Depending on the setting weight or setting of the center of gravity, for example, a substance having a specific gravity smaller than that of the deposition material may be put into the clearance.

To reduce the weight of the shaped object, for example, the clearance may be formed to be empty. In this case, "the clearance may be formed to be empty" means that the clearance becomes empty at the time when the shaped object is completely shaped. In this case, "the time when the shaped object is completely shaped" means the time when all processes related to shaping of the shaped object are completed, for example. "The clearance becomes empty" means a state in which only surrounding air and the like enter the clearance without intentionally filling other substances and the like.

In a case of forming a plurality of clearances in the shaped object, a substance and the like to be put into each clearance may be different for each clearance. A substance having a specific gravity different from that of the deposition material may be put into only a part of the clearances, and the other clearances may be empty. With this configuration, for example, the weight and the center of gravity of the shaped object can be adjusted more finely by combining the clearances. In this case, for example, it is preferable to form a plurality of clearances having the same shape. With this configuration, for example, by standardizing an operation of forming the clearance, a shaping operation can be appropriately prevented from being complicated.

The shaped object may be configured such that, for example, a weight is put in the clearance, and the weight moves within the clearance in accordance with orientation of the shaped object. With this configuration, the center of gravity of the shaped object can be changed in accordance with the orientation of the shaped object. Accordingly, for example, more diverse shaped objects can be shaped.

In a case of putting another substance into the clearance at the time of forming the clearance, for example, the deposition material may be further deposited on the substance. In a case of forming the clearance to be empty, for example, an opening of the clearance may be blocked with a lid prepared in advance, and the deposition material may be further formed thereon.

At the time of forming the clearance to be empty, for example, the clearance may be formed in a state of being filled with filling material such as fluid material. In this case, after the deposition material is deposited on the filling material, the filling material is removed through a hole and the like formed in advance. In this case, for example, a through hole communicating the inside of the clearance with the outside of the shaped object may be formed as the hole for removing the filling material.

In this case, for example, it is preferable to use fluid material and the like having a specific gravity larger than that of the deposition material as the filling material. With this configuration, for example, a layer of the deposition material can be appropriately formed on the filling material. In this case, by using the fluid material as the filling material, for example, the filling material can be appropriately removed after the layer of the deposition material is formed. Depending on quality and the like required for the shaped object, for example, the fluid material may be kept in at least some of the clearances after the shaped object is completed. As the fluid material, for example, water, a saturated hydrocarbon (paraffin-base, naphthenic-base, and the like), mineral oil, glycerol, or a mixture and the like thereof may be used. In a practical use, water or liquid and the like containing water as a principal component can be preferably used as the fluid material.

In a case of using such fluid material, a wall part may be formed on a shaping table for storing fluid material that has overflowed during the shaping operation. In this case, for example, the shaping table is a table-like member having an upper surface on which the shaped object during the shaping process is placed. More specifically, in this case, for example, a wall part surrounding the shaped object during the shaping process may be further formed on the shaping table with a gap therebetween at the time of shaping the shaped object. With this configuration, for example, when the fluid material overflows from the inside of the clearance of the shaped object, the fluid material can be appropriately stored between the shaped object during the shaping process and the wall part.

As a shaping method performed by using the fluid material, for example, a liquid storage container and the like arranged at a position opposed to a head part across the shaping table may be used. In this case, for example, the head part means a configuration of ejecting shaping material. In this case, for example, the shaped object during the shaping process may be immersed in liquid within the liquid storage container together with the shaping table in at least part of a period during the shaping process of the shaped object. With this configuration, the fluid material can also be appropriately stored in the liquid storage container when the fluid material overflows from the clearance. In this case, the liquid within the liquid storage container may be used as a fluid support member that supports the shaped object from the outside of the shaped object, for example.

As the configuration of the present disclosure, a shaping device and the like having the same characteristic as described above may be used. In this case, for example, the same effect as described above can be obtained.

According to the present disclosure, for example, a shaped object can be more appropriately manufactured by adjusting the weight and the like of the shaped object.

BRIEF DESCRIPTION OF THE DRAWINGS

FIG. 1A illustrates a configuration example of the shaping system 10, and FIGS. 1B and 1C illustrate a configuration example of a principal part of a shaping device 12.

FIG. 2A illustrates a configuration example of the shaped object 50 manufactured by using a conventional method, FIG. 2B illustrates a configuration example of the shaped object 50 shaped in this example, and FIG. 2C illustrates a shape of a clearance formed in this example.

FIG. 3A is a functional block diagram illustrating a function of the shaping system 10, and FIG. 3B is a diagram illustrating an example of setting of the center of gravity in this example.

FIG. 4A illustrates a configuration example of the shaped object 50 used as a lure, FIG. 4B is a diagram for explaining an operation of shaping the shaped object 50 illustrated in FIG. 4A in more detail, and FIG. 4C is a perspective view illustrating a frame body 70 and a weight 72 arranged inside the shaped object 50 in more detail.

FIG. 5A illustrates a configuration example of the shaped object 50 according to this modification, and FIG. 5B illustrates another example of the configuration of the shaped object 50 according to this modification.

FIG. 7A illustrates a configuration of a cross section orthogonal to a sub-scanning direction of the shaped object 50 according to this modification, and FIG. 7B is a cross-sectional view illustrating the shaped object 50 in the middle of a shaping process.

FIG. 9A illustrates a configuration example of the shaping device 12 according to this modification, FIG. 9B illustrates a configuration example of a head part 102 of the shaping device 12, and FIG. 9C illustrates a configuration example of the shaped object 50 shaped in this modification.

FIG. 10A illustrates a configuration example of the shaping device 12 according to this modification, and FIGS. 10B and 10C illustrate an example of a relation between necessity of a support layer 52 in a solid state and the shape of the shaped object 50.

DESCRIPTION OF EMBODIMENTS

Figure 1A:
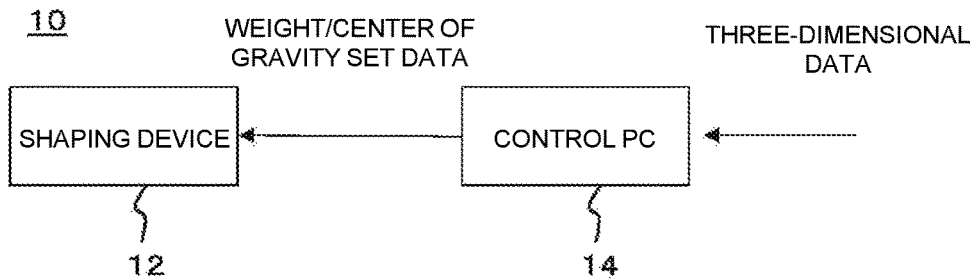
FIGS. 1A to 1C are diagrams illustrating an example of a shaping system 10 that executes a manufacturing method for a shaped object according to an embodiment of the present disclosure.
Figure 1B:
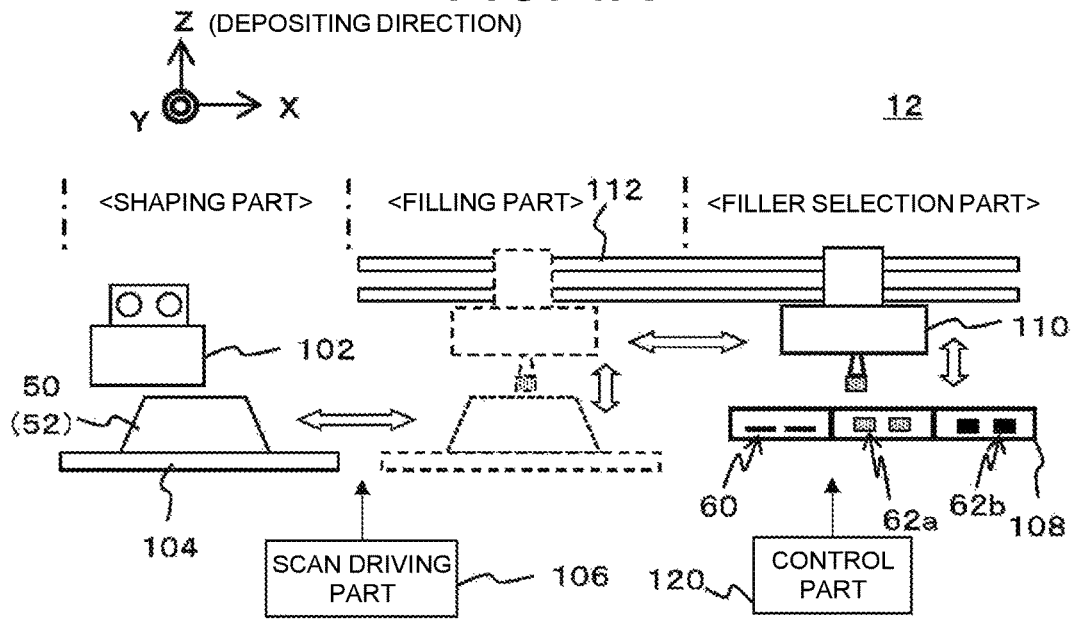
Figure 1C:
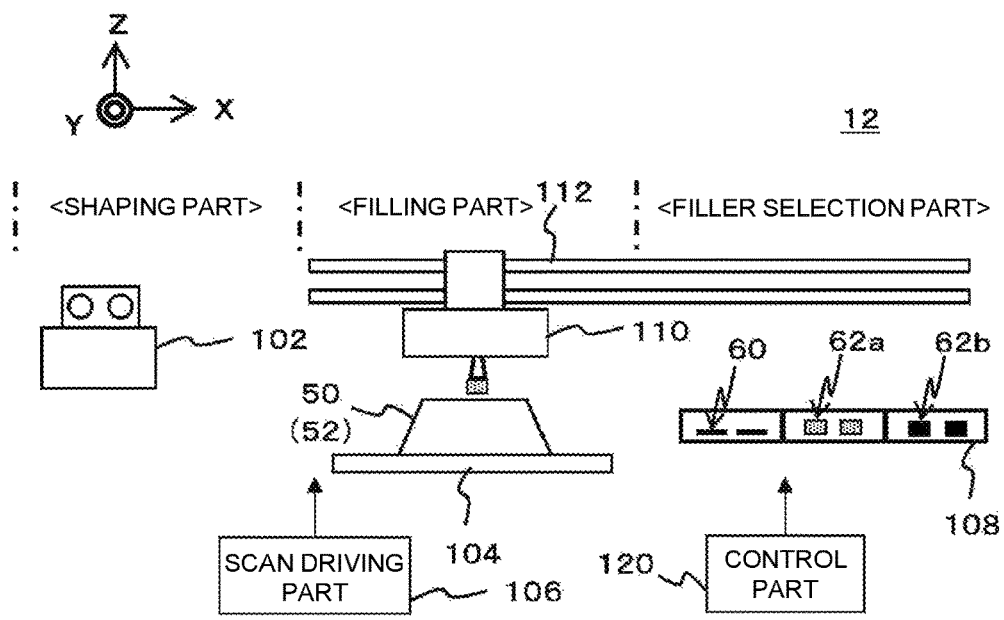

The following describes an embodiment of the present disclosure with reference to the drawings. FIGS. 1A to 1C are diagrams illustrating an example of a shaping system 10 that executes a manufacturing method for a shaped object according to an embodiment of the present disclosure. FIG. 1A illustrates a configuration example of the shaping system 10. In this example, the shaping system 10 is a shaping system that shapes a three-dimensional shaped object (three-dimensional shaping system), and includes a shaping device 12 and a control PC 14.

The shaping device 12 is a device for manufacturing the three-dimensional shaped object by depositing layers of shaping material, and receives data indicating the shaped object from the control PC 14 to shape the shaped object based on the data. More specifically, in this example, the shaping device 12 receives data in which weight and the center of gravity are set for the shaped object to be shaped (weight/center of gravity set data), and shapes the shaped object in accordance with the data.

As described later in more detail, in this example, the shaping device 12 shapes, for example, a shaped object including a plurality of clearances (cavities) therein in accordance with setting of the weight and the center of gravity. The weight and the center of gravity of the shaped object are adjusted by filling a filler in at least part of clearances as needed. Setting and the like of the weight and the center of gravity for the shaped object is described later in more detail.

The control PC 14 is a computer (host PC) for controlling an operation of the shaping device 12. In this example, the control PC 14 generates the weight/center of gravity set data based on three-dimensional data indicating the shaped object in a general-purpose data format, for example. In this case, the control PC 14 receives an instruction for the setting of the weight and the center of gravity from a manipulator (operator) of the shaping system 10, for example, and generates the weight/center of gravity set data based on the instruction. The control PC 14 then transmits the generated weight/center of gravity set data to the shaping device 12 to cause the shaping device 12 to perform a shaping operation.

As described above, in this example, the shaping system 10 is constituted of a plurality of devices, that is, the shaping device 12 and the control PC 14. However, according to a modification of the shaping system 10, the shaping system 10 may be constituted of one device. In this case, for example, the shaping system 10 may be configured with one shaping device 12 having a function of the control PC 14.

Subsequently, the following describes a specific configuration of the shaping device 12. FIGS. 1B and 1C illustrate a configuration example of a principal part of the shaping device 12. FIGS. 1B and 1C schematically illustrate an operation example of the principal part of the shaping device 12 for different timings during the shaping operation. In this example, the shaping device 12 is a device for shaping a shaped object 50 using a deposition shaping method with an ink-jet head, and separately includes a shaping part, a filling part, and a filler selection part as illustrated in the drawings. The deposition shaping method is, for example, a method of shaping the shaped object 50 by depositing a plurality of layers. The shaped object 50 is, for example, a three-dimensional three-dimensional structure.

Among parts of the shaping device 12, the shaping part is a portion for performing an operation of depositing the shaping material. The filling part is a portion for performing an operation of filling the filler in the clearance formed inside the shaped object 50. The filler selection part is a portion for performing an operation of selecting a filler to be filled in the clearance. As a specific configuration for executing the operation of each part, in this example, the shaping device 12 includes a head part 102, a shaping table 104, a scan driving part 106, a tray 108, an adsorption unit 110, a guide bar 112, and a control part 120.

Except the points described below, the shaping device 12 may have a configuration that is the same as or similar to that of a known shaping device. More specifically, except the points described below, the shaping device 12 may have, for example, a configuration that is the same as or similar to that of a known shaping device that performs shaping by ejecting droplets to be material of the shaped object 50 using an ink-jet head. In addition to the components illustrated in the drawings, the shaping device 12 may further include various components required for shaping the shaped object 50, for example.

The head part 102 is a portion for ejecting material of the shaped object 50. In this example, ink is used as the material of the shaped object 50. In this case, for example, the ink means liquid ejected from the ink-jet head. More specifically, in this example, the head part 102 includes a plurality of ink-jet heads. These ink-jet heads eject ink to be cured depending on a predetermined condition as the material of the shaped object 50. The head part 102 further includes an ultraviolet light source that generates ultraviolet rays, and irradiates landed ink with ultraviolet rays to cure the ink. Due to this, each of the layers constituting the shaped object 50 is formed by deposition on another layer, and the shaped object is shaped using the deposition shaping method. In this example, ultraviolet curable ink (UV ink) is used as the ink, the ultraviolet curable ink to be cured from a liquid state due to irradiation of the ultraviolet rays.

The head part 102 further ejects material of a support layer 52 in addition to the material of the shaped object 50. Accordingly, the shaping device 12 forms the support layer 52 around the shaped object 50 as needed. The support layer 52 is, for example, a deposited structure that surrounds an outer circumference of the shaped object 50 being shaped to support the shaped object 50. The support layer 52 is formed as needed at the time when the shaped object 50 is shaped, and removed after a shaping process performed by the shaping device 12 is completed (after a depositing operation is completed). For convenience of illustration, FIGS. 1B and 1C collectively illustrate the shaped object 50 being shaped and the support layer 52.

In this example, the ink used as the material of the shaped object 50 is an example of deposition material used for deposition. In this case, the ink used as the material of the shaped object 50 means, for example, ink other than the material of the support layer 52. In this example, for example, the head part 102 further includes a planarizing module for planarizing a layer of the ink before the ink is cured. As the planarizing module, for example, a roller and the like can be preferably used, the roller planarizing the layer of the ink by scraping off part of the ink before curing.

As the shaped object 50 shaped in this example, for example, the shaping device 12 may shape the shaped object 50 the surface of which is colored. In this case, for example, the head part 102 includes ink-jet heads for ink of respective colors as basic colors (process colors) for color expression. In this case, for example, it is preferable that the head part 102 further include a light reflecting ink (for example, ink of white color) used for forming a light reflecting region, and an ink-jet head for colorless and transparent clear ink. In this case, the light reflecting region is formed inside the colored region of the surface of the shaped object 50. The head part 102 may further include, for example, an ink-jet head for ink dedicated for shaping used for forming an inner part of the shaped object 50.

The shaping table 104 is a table-like member that supports the shaped object 50 being shaped, and the shaped object 50 being shaped is placed on an upper surface of the shaping table 104. At the time of forming the layer of the ink, as illustrated in FIG. 1B for example, the shaping table 104 supports the shaped object 50 to be opposed to the head part 102 in the shaping part of the shaping device 12. In this example, the shaping table 104 has a configuration in which at least the upper surface thereof is movable in a deposition direction (Z-direction in the drawing). When being driven by the scan driving part 106, the shaping table 104 moves at least the upper surface in accordance with progress of the shaping of the shaped object 50. In this case, for example, the deposition direction means a direction in which the shaping material is deposited in the deposition shaping method. More specifically, in this example, the deposition direction is a direction orthogonal to a main scanning direction (Y-direction in the drawing) and a sub-scanning direction (X-direction in the drawing).

In this example, the shaping table 104 is movable also in an in-plane direction orthogonal to the deposition direction. For example, at the timing when the filler is filled in the clearance within the shaped object 50, as illustrated in FIG. 1C for example, the shaping table 104 leaves the position opposed to the head part 102 and moves to the filling part. Accordingly, in the filling part, the shaped object 50 is caused to be opposed to the adsorption unit 110.

The scan driving part 106 is a driving unit that causes the head part 102 to perform a scanning operation of moving relatively to the shaped object 50 being shaped. In this case, "moving relatively to the shaped object 50 being shaped" means, for example, to move relatively to the shaping table 104. The phrase of "causes the head part 102 to perform a scanning operation" means, for example, to cause the ink-jet head included in the head part 102 to perform the scanning operation. In this example, the scan driving part 106 causes the head part 102 to perform a main scanning operation (Y-scanning), a sub-scanning operation (X-scanning), and a deposition direction scanning (Z-scanning).

The main scanning operation means, for example, an operation of ejecting the ink while moving in the main scanning direction. The sub-scanning operation means, for example, an operation of moving relatively to the shaping table 104 in the sub-scanning direction orthogonal to the main scanning direction. The deposition direction scanning means, for example, an operation of moving the head part 102 in the deposition direction relatively to the shaped object 50. The shaping table 104 moves at least one of the head part 102 and the shaping table 104 to cause the head part 102 to perform these scanning operations.

In this example, the scan driving part 106 further moves the shaping table 104, the adsorption unit 110, and the like at the time when the operation of filling the filler in the clearance of the shaped object 50 is performed, for example. More specifically, at the time when the operation of filling the filler in the clearance is performed, as illustrated in FIG. 1B for example, the scan driving part 106 causes the adsorption unit 110 to adsorb the filler (fillers 62a and 62b in the drawing) in the filler selection part. After adsorption, as illustrated in FIG. 1C, the adsorption unit 110 in a state of holding the filler is moved to the filling part. In accordance with the movement of the adsorption unit 110, the scan driving part 106 further moves the shaping table 104 supporting the shaped object 50 being shaped to the filling part. Accordingly, the shaped object 50 is caused to be opposed to the adsorption unit 110 in the filling part. By aligning a position of the filler held by the adsorption unit 110 with the clearance formed within the shaped object 50, and stopping adsorption of the filler and the like performed by the adsorption unit 110, the filler is arranged in the clearance.

For example, in a case of forming the clearance in which the filler is not filled is formed in the shaped object 50, the scan driving part 106 causes the adsorption unit 110 to adsorb a lid 60 in place of the filler. In the filling part, the lid 60 is arranged to block (cover) the opening of the clearance. In this case, the opening of the clearance means an opening that opens upward in the deposition direction.

The tray 108 is a holding part that holds the lid 60, the fillers 62a and 62b, and the like in the filler selection part. In this case, as described above, the lid 60 is a member for blocking the opening of the clearance within the shaped object 50 as needed. The fillers 62a and 62b are members to be put in the clearance within the shaped object 50. In this example, the tray 108 holds, as the fillers 62a and 62b, fillers having a specific gravity different from that of respective types of ink as the material of the shaped object 50. In this case, "fillers having a specific gravity different from that of respective types of ink" means, for example, that the weight of the filler is different from that in a case in which an object having the same shape as the filler is formed with the respective types of ink.

In this example, fillers having different weights are used as a plurality of types of fillers 62a and 62b. In this case, for example, a filler having a specific gravity smaller than that of the respective types of ink may be used as one of a plurality of types of fillers 62a and 62b, and a filler having a specific gravity larger than that of the respective pieces of ink may be used as the other one thereof. With this configuration, for example, the weight and the specific gravity of the shaped object 50 can be appropriately adjusted in more diverse ways.

For convenience of illustration, FIGS. 1B and 1C simplifies and illustrates the shape of the fillers 62a and 62b in a rectangular parallelepiped shape. However, it is preferable that the shape of the fillers 62a and 62b be matched with the shape of the clearance, for example. The shape of the clearance and the like is described later in more detail.

The adsorption unit 110 has a configuration of adsorbing and moving the lid 60 or the fillers 62a and 62b held by the tray 108. In this example, as described above, the adsorption unit 110 adsorbs the lid 60 and the fillers 62a and 62b held by the tray 108 in the filler selection part to be moved to the filling part. In the filling part, the adsorption unit 110 also arranges the lid 60 on an upper part of the clearance within the shaped object 50, and arranges the fillers 62a and 62b in the clearance.

In this example, the adsorption unit 110 moves along the guide bar 112 when being driven by the scan driving part 106. The guide bar 112 is a rod-like member that guides movement of the adsorption unit 110. In this example, the guide bar 112 extends in the sub-scanning direction, and guides the movement of the adsorption unit 110 in the sub-scanning direction.

The control part 120 is, for example, a CPU of the shaping device 12, and controls the respective parts of the shaping device 12 to control the shaping operation of the shaped object 50. In this example, the control part 120 forms a plurality of clearances within the shaped object 50 based on the weight/center of gravity set data received from the control PC 14. The control part 120 arranges the filler in at least some of the clearances as needed. Accordingly, the control part 120 causes the shaping device 12 to shape the shaped object 50 in a state in which the weight and the center of gravity are adjusted. In this case, "to shape the shaped object 50 in a state in which the weight and the center of gravity are adjusted" means, for example, to shape the shaped object 50 in a state in which the weight and the center of gravity are different from those in a case in which the shaped object 50 is shaped without forming the clearance therein, based on the setting of the weight and the center of gravity received from the manipulator of the shaping system 10. In this example, for example, the shaped object can be more appropriately manufactured by adjusting the weight and the like of the shaped object.

In the above description, mainly described is a case in which the shaping device 12 is configured such that the lid 60 and the fillers 62a and 62b are automatically arranged by the adsorption unit 110. In this case, in the middle of the shaping operation, the operation of depositing the layer of the ink is temporarily stopped in the shaping part at the timing when the clearance is formed. The lid 60 and the fillers 62a and 62b are then arranged in the filling part. After the lid 60 and the like are arranged, the operation of depositing the layer of the ink is continued in the shaping part. According to a modification of the configuration of the shaping device 12, for example, the lid 60 and the fillers 62a and 62b may be manually arranged by the manipulator. In this case, for example, the operation of depositing the layer of the ink may be appropriately interrupted to arrange the lid 60 and the fillers 62a and 62b.

Figure 2A:
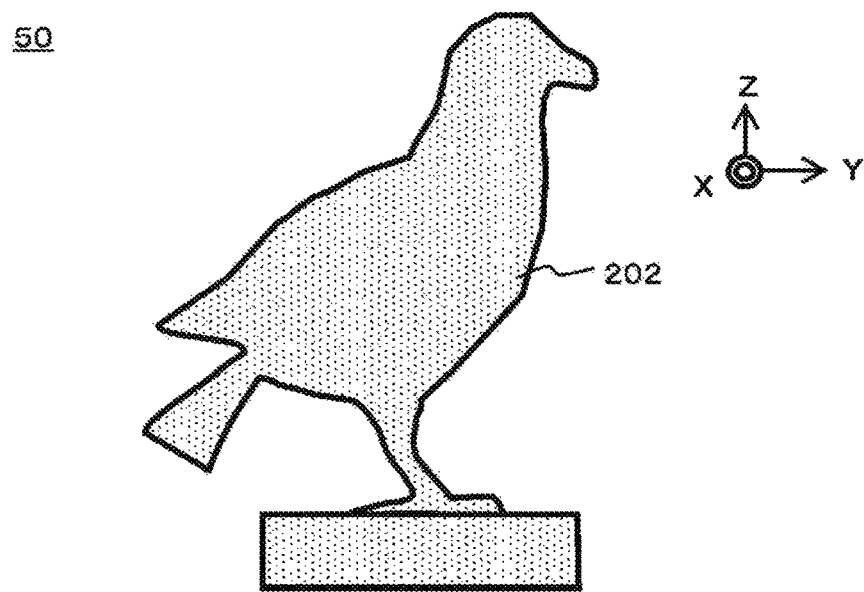
FIGS. 2A to 2C are diagrams for explaining a shaped object 50 in more detail.
Figure 2B:
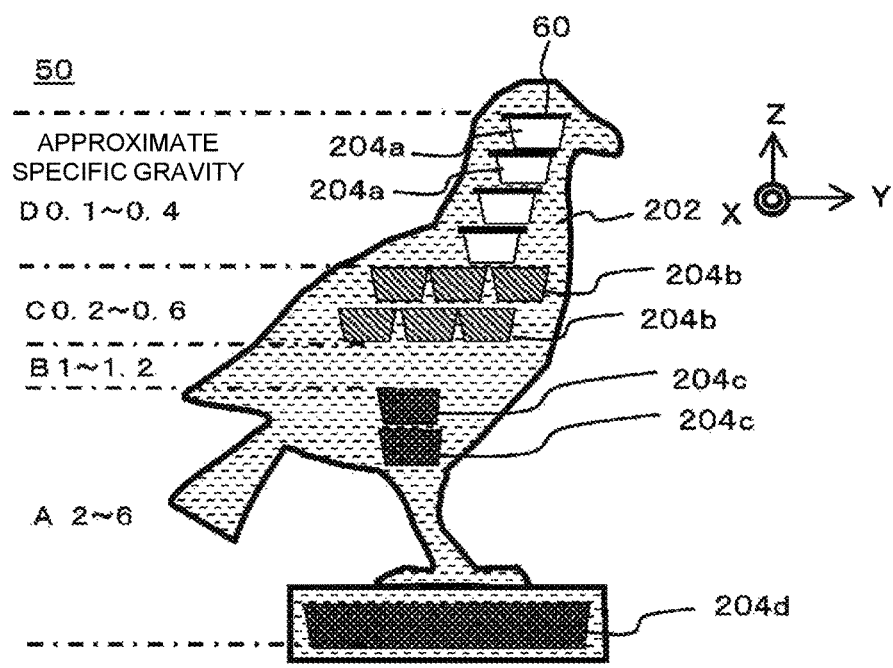
Figure 2C:

Subsequently, the following describes the shaped object 50 manufactured in this example in more detail. FIGS. 2A to 2C are diagrams for explaining the shaped object 50 in more detail. FIG. 2A is a diagram illustrating a configuration example of the shaped object 50 manufactured by using a conventional method, and simplifies the configuration example of a cross section orthogonal to the sub-scanning direction of the shaped object 50 to be illustrated.

In a case of manufacturing the shaped object 50 with the shaping device, the shaped object 50 may be shaped in various shapes like the shaped object 50 having a bird shape as illustrated in the drawing. In this case, if the shaped object 50 is simply shaped, for example, the entire shaped object 50 typically becomes a model part 202 as illustrated in the drawing. In this case, the model part 202 of the shaped object 50 is a portion formed with the ink as the shaping material of the shaped object 50. The model part 202 can be considered to be, for example, a region made of stuff used for shaping (shaping stuff).

However, when the shaped object 50 is shaped as described above, the center of gravity may be unbalanced depending on the shape of the shaped object 50, and the shaped object 50 may fall when being arranged in an essential posture. In this case, "arranging the shaped object 50 in an essential posture" means to arrange the shaped object 50 in an essential posture of a target expressed by the shaped object 50 as in a case of arranging the shaped object 50 in a posture like a standing bird when the shaped object 50 having a bird shape is shaped, for example.

Regarding the problem of the center of gravity, as illustrated in the drawing for example, balance of the entire shaped object 50 may be adjusted by forming a base at the lowermost part of the shaped object 50. However, in this case, the shaped object 50 may be easily broken if there is an unbalanced portion other than the base. More specifically, as illustrated in the drawing for example, in a case of shaping the shaped object 50 having a bird shape, a leg part of the bird is a thin portion, so that the leg part may be easily broken due to influence of the weight of a portion upper than the leg part.

In addition to the problem of the center of gravity, for example, the weight itself of the shaped object 50 may become a problem. For example, as illustrated in FIG. 2A, in a case of shaping the shaped object 50 using a conventional method, the weight of the shaped object 50 is determined based on the specific gravity of the ink used for shaping and the size of the shaped object 50. In this case, as the size of the shaped object 50 increases, the weight is increased accordingly. However, depending on the use of the shaped object 50, there may be a case in which the weight of the shaped object 50 may be desired to be heavier, or desired to be lighter, and the like.

In this example, as described above, the weight and the center of gravity of the shaped object 50 are adjusted by forming a plurality of clearances within the shaped object 50 and filling the filler in at least some of the clearances as needed. FIG. 2B is a diagram illustrating a configuration example of the shaped object 50 shaped in this example, and illustrates a simplified configuration example of a cross section orthogonal to the sub-scanning direction of the shaped object 50 as an example. FIG. 2C illustrates a shape of the clearance formed in this example.

As described above, in this example, the shaping device 12 (refer to FIGS. 1A to 1C) shapes the shaped object 50 including a plurality of clearances therein. In this case, the clearance is a portion other than the model part 202 inside the shaped object 50. More specifically, in this example, a plurality of types of clearances 204a to 204d are formed inside the shaped object 50. Among these, the clearances 204a to 204c are clearances formed inside a main body portion of the shaped object 50, and formed to have the same shape. In this case, the main body portion of the shaped object 50 means a portion obtained by removing an additional portion such as a base from the entire shaped object 50. The phrase of "the clearances have the same shape" means, for example, wall surfaces (side surfaces) surrounding the clearances have the same shape.

As illustrated in the drawing, in this example, the shapes of all the clearances formed in the main body portion of the shaped object 50 are fixed to be the same. With this configuration, for example, the shaping operation can be appropriately prevented from being complicated by standardizing the operation of forming the clearance. In this case, for example, a design operation of generating the weight/center of gravity set data can be more simplified. By forming a large number of small clearances having a fixed shape, for example, the weight and the center of gravity of the shaped object 50 can be finely adjusted more appropriately. For example, as the filler to be filled in the clearance, the filler having a certain shape can be used in common. Additionally, in a case of automatically arranging the lid on the clearance or arranging the filler in the clearance like a case of using the shaping device 12 in this example, control can be more facilitated by causing the shapes of the clearances to be the same.

In this example, the clearance within the shaped object 50 is formed without using the support layer. Thus, as illustrated in FIG. 2C as a clearance 204, the clearance is formed in a shape such that the side surface thereof does not overhang in the deposition direction. In this case, "does not overhang" means that an angle θ illustrated in the drawing is equal to or smaller than about 90°.

In this example, internal states of the clearances 204a to 204c are made different from each other to cause the weight at positions of the clearances to be different from each other. As illustrated in the drawing, a plurality of clearances are formed as the clearances 204a to 204c. With this configuration, for example, the weight and the center of gravity of the shaped object 50 can be appropriately adjusted.

More specifically, among the clearances 204a to 204c, the clearance 204a is a clearance to be empty. In this case, "clearance to be empty" means that the clearance becomes empty in a state in which at least all processes related to shaping of the shaped object 50 are completed. Additionally, "clearance becomes empty" means a state in which another substance and the like are not intentionally filled in the clearance and only surrounding air and the like enter the clearance. By forming such an empty clearance 204a within the shaped object 50, for example, the weight of the shaped object 50 can be reduced.

The ultraviolet curable ink used as the material of the shaped object 50 in the deposition shaping method has the specific gravity of, for example, about 1 to 1.2 in a state of cured resin. Thus, when the empty clearance 204a is formed, the weight of the shaped object 50 can be reduced at a rate of about 1 to 1.2 g (gram) per capacity of 1 $cm^3$. In this case, by forming the empty clearance 204a inside part of the shaped object 50, for example, the center of gravity of the shaped object 50 can be adjusted.

In a case of forming the clearance inside the shaped object 50, the layer of the ink is required to be further deposited on the clearance. Thus, in this example, in a case of forming the empty clearance 204a, the opening of the clearance 204a is blocked with the lid 60 as described above. In this case, after the clearance 204a is formed, the opening of the clearance 204a is blocked with the lid 60, and the ink is further deposited on the lid 60. With this configuration, for example, the empty clearance 204a can be appropriately formed inside the shaped object 50. As the clearance 204a, for example, a clearance on which only the lid 60 is arranged and the filler is not arranged can be considered.

The clearances 204b and 204c are clearances to be filled with the filler. Among these, the clearance 204b is a clearance in which a light filler having a specific gravity smaller than that of the ink used for forming the model part 202 is arranged. In this example, the filler arranged in the clearance 204b is, for example, one of the fillers 62a and 62b (refer to FIGS. 1A to 1C). By forming such a clearance 204b, the weight of part of the shaped object 50 can be reduced in a state in which the weight is increased as compared with that in a case of forming the empty clearance 204a.

The clearance 204c is a clearance in which a heavy filler having a specific gravity larger than that of the ink used for forming the model part 202 is arranged. In this example, the filler arranged in the clearance 204c is, for example, the other one of the fillers 62a and 62b. By forming such a clearance 204c, the weight of part of the shaped object 50 can be increased as compared with a case of the model part 202.

As the filler to be arranged in the clearance 204c, for example, a filler made of metal and the like may be used. More specifically, for example, a filler made of steel having a specific gravity of about 7 to 8 may be used. In this case, by arranging the filler in the clearance 204c, the weight of the shaped object 50 can be increased at a rate of about 6 to 7 g (gram) per capacity of 1 $cm^3$. As the filler for the clearance 204c, for example, a filler made of aluminum having a specific gravity of about 2.7 may be used. In this case, by arranging the filler in the clearance 204c, the weight of the shaped object 50 can be increased at a rate of about 1.5 to 1.7 g (gram) per capacity of 1 $cm^3$. As the filler for the clearance 204c, for example, a filler made of stainless steel (SUS) may be used.

As illustrated in the drawing, in this example, a filler having a shape matched with the clearances 204b and 204c is used as the filler for the clearances 204b and 204c. In this case, the layer of the ink can be formed on the clearances 204b and 204c even if the lid 60 is not arranged, for example. Thus, in this example, the layer of the ink is formed on the filler of the clearances 204b and 204c to block the opening without using the lid 60.

Among the clearances formed in the shaped object 50, the clearance 204d is a clearance formed inside a portion that is formed as a base of the shaped object 50. In this case, the base of the shaped object 50 is, for example, a portion that supports the entire shaped object 50 at the lowermost part in a gravity direction when the shaped object 50 is arranged in a predetermined orientation. In this case, to stably support the shaped object 50, the base portion is preferably formed to be sufficiently heavy. With this configuration, for example, horizontal stability can be appropriately improved by lowering the center of gravity of the entire shaped object 50.

It is sufficient that the weight of the base portion be increased, and fine adjustment and the like are not required. Thus, in this example, the shape of the clearance 204d is made different from that of the other clearances 204a to 204c to be a larger clearance. For example, similarly to the clearance 204c, a heavy filler having a large specific gravity is arranged in the clearance 204d.

As the filler to be arranged in the clearance 204d, a larger filler having a shape different from that of the filler for the clearances 204b and 204c may be used in accordance with the shape of the clearance. In this case, the tray 108 of the shaping device 12 (refer to FIGS. 1A to 1C) further holds the filler for the clearance 204d, for example. The large filler for the clearance 204d may be manually arranged by the manipulator during the shaping operation, for example. In the clearance 204d, for example, a plurality of fillers having the same shape as that of the filler for the clearances 204b and 204c may be arranged.

By forming the clearances 204a to 204d as described above, for example, the weight and the center of gravity of the shaped object 50 can be appropriately changed. By changing the number or distribution thereof, the weight and the center of gravity of the shaped object 50 can be appropriately adjusted.

More specifically, in a case illustrated in the drawing, the shaped object 50 is divided into four regions A to D sequentially from the bottom in a weight direction, and the weight of a lower portion is increased and the weight of an upper portion is reduced. For example, the region A including the base and the lowermost portion of the main body is formed to have the specific gravity of about 2 to 6, for example, by forming the clearances 204c and 204d. The region B above the region A is formed, for example, to have a specific gravity of about 1 to 1.2, that is, original specific gravity of the model part 202 by not forming the clearance. The region C above the region B is formed to have a specific gravity of about 0.2 to 0.6, for example, by forming the clearance 204b. The further upper region C is formed to have a specific gravity of about 0.1 to 0.4, for example, by forming the clearance 204a. With this configuration, the shaped object 50 the center of gravity of which is low can be appropriately shaped in a stable state.

Regarding the weight and the center of gravity of the shaped object 50, FIG. 2B simply illustrates a case in which the weight of a lower portion is increased and the weight of an upper portion is reduced. However, the weight and the center of gravity of the shaped object 50 may be set in more detail in accordance with a target expressed by the shaped object 50. More specifically, for example, in a case of creating three-dimensional data (original data) indicating the shaped object 50 by photography using a 3D scanner, for example, the shaping process may be performed so that the weight of the shaped object 50 is matched with the weight of an object to be measured by the 3D scanner. In this case, if the shaping is performed by reducing or enlarging a measurement result, for example, the shaping maybe performed by scaling the weight in accordance with magnification thereof. The center of gravity of the shaped object 50 may be set in accordance with the object to be measured.

In a case of creating the original data using CAD, for example, the weight and the center of gravity that are preferable may be assumed based on the specific gravity, a capacity, and the like of original material for the target to be expressed by the shaped object 50. Also in this case, if the shaping is performed by reducing or enlarging the measurement result, the shaping maybe performed by scaling the weight in accordance with magnification thereof. The center of gravity of the shaped object 50 may be set in accordance with the center of gravity assumed as described above.

As the shaping operation of the shaped object 50 in this example, for example, there may be an operation of forming at least part of the shaped object 50 in a state of including the clearances 204a to 204d as described above therein, and matching the weight thereof with a setting weight set in advance. In this case, the setting weight is, for example, weight set to at least part of the shaped object 50. For example, the setting weight is set to be a weight different from a filling weight that is weight in a case of forming at least part of the shaped object 50 without forming the clearance. In this case, by forming the empty clearance 204a, the clearances 204b and 204c in which the filler having the specific gravity different from that of the model part 202 is arranged, and the like, the shaped object 50 is shaped so that the respective parts of the shaped object 50 are matched with the setting weight.

In this example, by forming the clearance within the shaped object 50, for example, the ink to be used for shaping can be saved. More specifically, in a case of shaping the shaped object 50 without forming the clearance, for example, an internal region that is less important than surroundings of a surface of an external appearance is also formed with expensive material (ink). In a case of forming the clearance within the shaped object 50, for example, the use amount of the ink can be appropriately reduced by emptying the clearance. In a case of filling the clearance with the filler, for example, material the cost of which is lower than that of the ink can be used. Thus, according to this example, production cost for the shaped object 50 can also be reduced, for example.

Figure 3A:
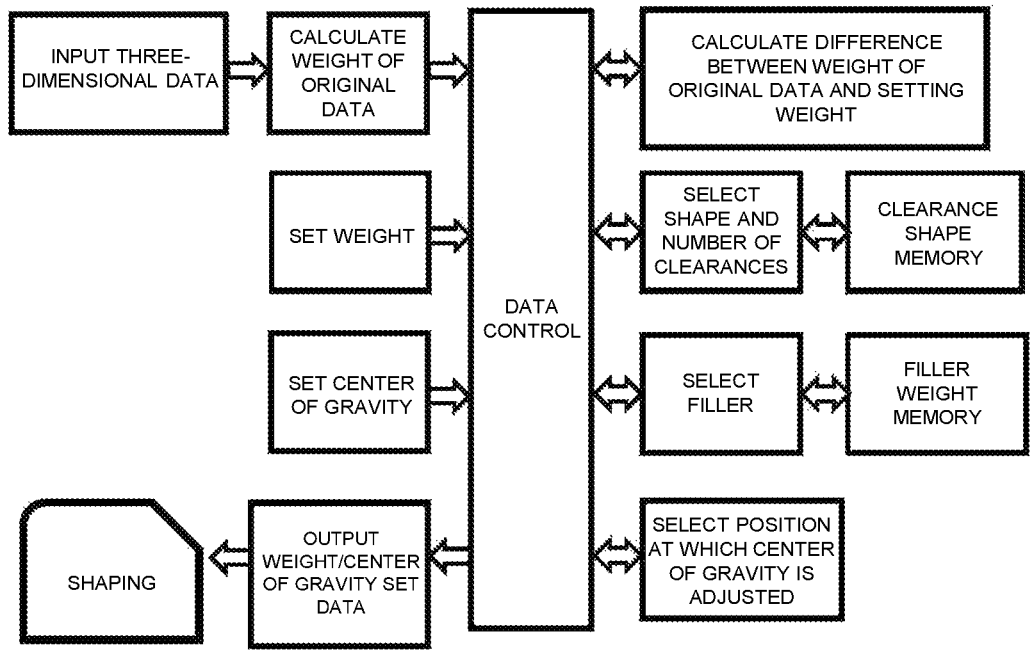
FIGS. 3A and 3B are diagrams for explaining an operation of setting the weight and the center of gravity of the shaped object 50.
Figure 3B:
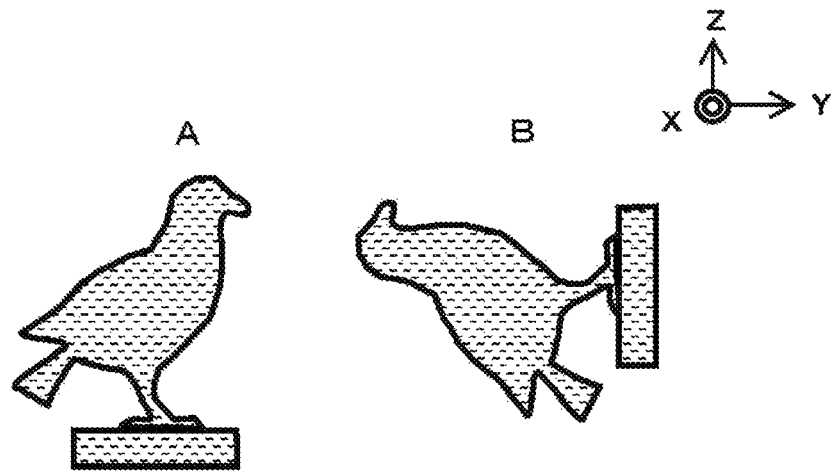

Subsequently, the following describes an operation of setting the weight and the center of gravity of the shaped object 50 in more detail. FIGS. 3A and 3B are diagrams for explaining the operation of setting the weight and the center of gravity of the shaped object 50. FIG. 3A is a functional block diagram illustrating a function of the shaping system 10. FIG. 3B is a diagram illustrating an example of setting of the center of gravity in this example.

FIG. 3A is a diagram schematically illustrating various functions of the shaping system 10 related to the operation of setting the weight and the center of gravity of the shaped object 50. Thus, each block does not necessarily correspond to a physical configuration (for example, a unit of an electronic circuit). Among blocks illustrated in FIG. 3A, a block indicating shaping represents, for example, a function of the shaping device 12 (refer to FIG. 1A). A block indicating a function other than shaping represents, for example, a function of the control PC 14 (refer to FIGS. 1A to 1C). According to a modification of the configuration of the shaping system 10, at least some of the functions other than shaping may be executed by the shaping device 12.

As described above in relation to FIGS. 1A to 1C, in this example, the control PC 14 generates the weight/center of gravity set data based on the three-dimensional data indicating the shaped object 50 to be shaped by the shaping device 12. In this case, the control PC 14 inputs the three-dimensional data as original data for shaping through an operation of CAD software or by receiving the three-dimensional data from a client server, for example. The control PC 14 calculates the weight of the shaped object 50 in a case in which shaping is performed using the original data as it is (calculation of original data weight) based on the input three-dimensional data (original data).

In this example, the control PC 14 further receives an instruction for setting the weight and the center of gravity of the shaped object 50 from the manipulator. More specifically, in this case, the manipulator sets the weight of the shaped object 50 to be weight that is finally desired (weight setting). In this case, "weight that is finally desired" means the weight of the final shaped object 50 (the weight of the entire shaped object 50) at the time when shaping is completed.

The manipulator further sets a direction of the center of gravity of the shaped object 50 that is finally desired (setting of the center of gravity). In this case, "direction of the center of gravity that is finally desired" means a direction of the center of gravity matched with an orientation in which the shaped object 50 is arranged after shaping is completed. More specifically, the center of gravity is set by selecting, as an end, a side of any of XYZ directions including the sub-scanning direction (X-direction), the main scanning direction (Y-direction), and the deposition direction (Z-direction), for example. That is, in this case, any of six directions including +X, −X, +Y, −Y, +Z, and −Z is selected. In this case, for example, −Z is selected in a case of shaping the shaped object 50 in an orientation represented by a reference sign A in FIG. 3B, and +Y is selected in a case of shaping the shaped object 50 in an orientation represented by a reference sign B.

After the weight and the center of gravity are set by the manipulator, the control PC 14 calculates a difference between the weight corresponding to the original data and the weight that has been set (setting weight) (calculating a difference between the original data weight and the setting weight). The control PC 14 then performs arithmetic operation and control for adding the clearance or the filler into the shaped object 50 based on the calculation result, and generates the weight/center of gravity set data to be supplied to the shaping device 12 (data control).

More specifically, in this case, the control PC 14 selects the shape and the number of clearances required for eliminating the difference based on the calculated difference in weight, for example (selecting the shape and the number of clearances). In this case, for example, the shape and the number of clearances are selected by reading out the shape of the clearance to be used from a clearance shape memory storing shapes of a plurality of types of clearances prepared in advance. For each clearance, necessity of arrangement of the filler is determined, and the type of filler to be used in a case of arranging (filling) the filler is selected (filler selection). Due to this, the filler is allocated to each of the clearances, for example. In this case, the filler is allocated, for example, by reading out and utilizing the weight, the shape, and the like of the filler from a filler weight memory storing the weight, the shape, and the like for each of a plurality of types of fillers prepared in advance. In this example, a filler shape memory further stores the shape of the lid covering the opening of the clearance to be empty. The lid is allocated to the clearance to be empty based on the shape and the like of the lid read out from the filler shape memory.

After the weight of the shaped object 50 is matched with the setting weight by determining the shape and the number of clearances and the filler to be used, the direction of the center of gravity is adjusted by adjusting or selecting the position at which the clearance is formed, for example (selecting the position at which the center of gravity is adjusted). In this case, the direction of the center of gravity is adjusted by arranging the clearance in which a heavy filler is filled in the direction of the center of gravity and arranging the clearance in which a light filler is filled in a direction opposite to the direction of the center of gravity, for example, in accordance with the direction of the center of gravity set by the manipulator.

After adjusting the weight and the center of gravity as described above, the control PC 14 generates the weight/center of gravity set data in which the setting for the clearance and the filler is performed in accordance with an adjusted state. The control PC 14 then outputs the generated data to the shaping device 12 (output the weight/center of gravity set data). Due to this, the control PC 14 causes the shaping device 12 to shape the shaped object 50 the weight and the center of gravity of which are adjusted (shaping). According to this example, for example, the shaped object 50 can be more appropriately manufactured by adjusting the weight and the center of gravity of the shaped object 50.

In the above description, one example is specifically described for the operation of setting the weight and the center of gravity of the shaped object 50. However, a specific operation of setting the weight and the center of gravity is not limited to the operation described above, and may be variously modified. For example, a weight setting operation of setting the weight may be more generalized, for example, to be an operation of setting a desired setting weight to at least part of the shaped object 50. The operation of setting the center of gravity may be considered to be an operation of receiving, from the user, the instruction for the center of gravity as an instruction for designating the direction of the center of gravity of the shaped object 50, for example.

In the above description, mainly described is an operation of automatically adjusting the weight and the center of gravity by the control PC 14. However, according to a modification of the operation of the shaping system 10, for example, the weight and the center of gravity may be manually adjusted through an operation performed by the manipulator. In this case, for example, the weight and the center of gravity of the shaped object 50 may be adjusted when the manipulator himself/herself determines the shape and the number of clearances, the filler to be used, and the position of the clearance.

Figure 4A:
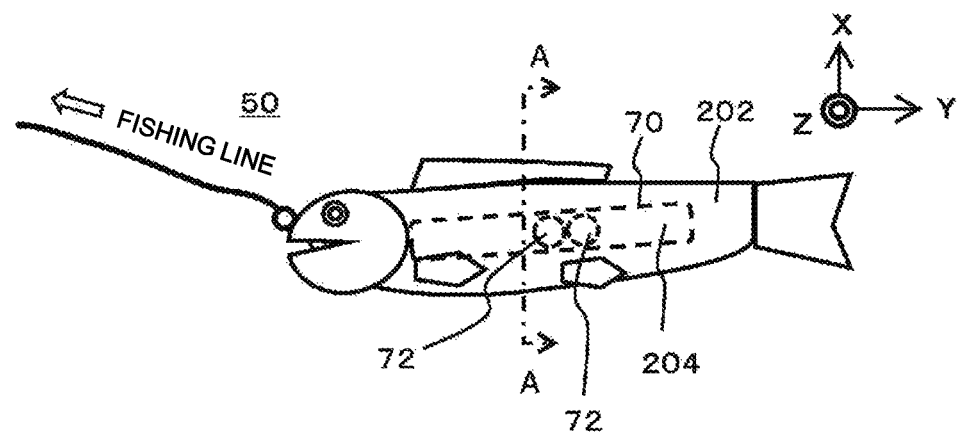
FIGS. 4A to 4C are diagrams illustrating a modification of the configuration of the shaped object 50.
Figure 4B:
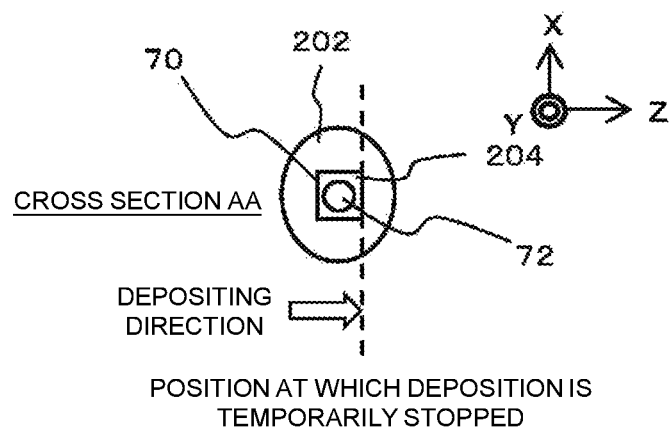
Figure 4C:
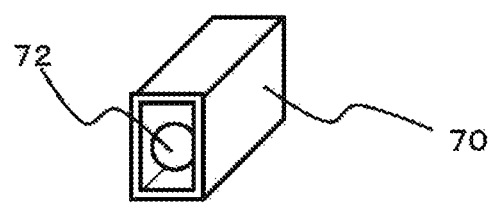

Subsequently, the following describes a modification of the shaped object 50 shaped by the shaping system 10 and a modification of the shaping operation performed by the shaping system 10. FIGS. 4A to 4C illustrate a modification of the configuration of the shaped object 50. Except the points described below, in FIGS. 4A to 4C, a component denoted by the same reference numeral as that in FIGS. 1A to 3B may have a characteristic that is the same as or similar to that of the component in FIGS. 1A to 3B.

In the above description, mainly described is a configuration in which the filler having the shape matched with the shape of the clearance is arranged in the clearance in a case in which the clearance is not kept empty. However, according to the modification of the configuration of the shaped object 50, for example, an object having a smaller size than that of the clearance may be arranged in the clearance. In this case, for example, a substance may be arranged so that the object can move within the clearance.

More specifically, FIGS. 4A to 4C illustrate a configuration example of the shaped object 50 in a case of shaping a lure to be used for fishing as the shaped object 50. FIG. 4A illustrates a configuration example of the shaped object 50 used as the lure. For convenience of illustration, FIG. 4A transparently illustrates a state of the clearance 204 formed inside the shaped object 50 using a dashed line.

As illustrated in the drawing, in this modification, a resin portion to be a main body of the lure is formed by depositing the layer of the ink, and a metal ball as a weight 72 is put in the clearance 204 formed inside the resin portion, the weight 72 being an object having a size smaller than that of the clearance 204. To facilitate the movement of the weight 72 within the clearance 204 as a movement space for the weight 72, a hollow frame body 70 is arranged within the clearance 204, and the weight 72 is put therein. As the frame body 70, for example, a frame body formed as a thin metal plate (for example, an SUS thin plate) can be preferably used. As illustrated in the drawing, a plurality of weights 72 are put in the frame body 70.

With this configuration, in a state after the shaping is completed (at the time when the lure is used, for example), the weight 72 in the clearance 204 moves within the clearance 204 in accordance with the orientation of the shaped object 50. In this case, the center of gravity of the shaped object 50 moves (varies) in accordance with the movement of the weight 72. More specifically, at the time when the shaped object 50 as the lure is used, a fishing line is connected to a head part of the lure as illustrated in the drawing. In this case, when the fishing line is pulled, the lure main body moves forward (in a head part direction), but the weight 72 within the lure moves (remains) rearward (in a tail part direction) due to inertia. As a result, the center of gravity moves rearward, and the tail part of the lure moves down. When pulling of the fishing line is stopped, the lure main body stops due to resistance of water, but the weight moves forward (in the head part direction) due to inertia. As a result, the center of gravity moves forward, and the head part moves down. When such an operation is repeated, the lure pitches (moves upward and downward), and can entice fishes.

FIG. 4B is a diagram for explaining the operation of shaping the shaped object 50 illustrated in FIG. 4A in more detail, and illustrates a configuration of a cross section (cross section AA) corresponding to a portion represented by an alternate long and short dash line in FIG. 4A. FIG. 4C is a perspective view illustrating the frame body 70 and the weight 72 to be arranged inside the shaped object 50 in more detail.

In a case of shaping the shaped object 50 according to this modification, the frame body 70 and the weight 72 are put in the clearance 204 in the middle of the operation of depositing the layer of the ink, and the layer of the ink is further formed thereon. More specifically, in this case, as illustrated in FIG. 4B for example, the depositing operation is temporarily stopped at the timing when the layer of the ink is deposited until the model part 202 is formed around a region as the clearance 204, and the frame body 70 and the weight 72 are arranged in the clearance 204. After this arrangement, deposition of the layer of the ink is started again, and the model part 202 is further formed on the frame body 70 in the deposition direction. With this configuration, the shaped object 50 the center of gravity of which moves can be appropriately shaped. Accordingly, for example, various shaped objects 50 can be more appropriately shaped.

Figure 5A:
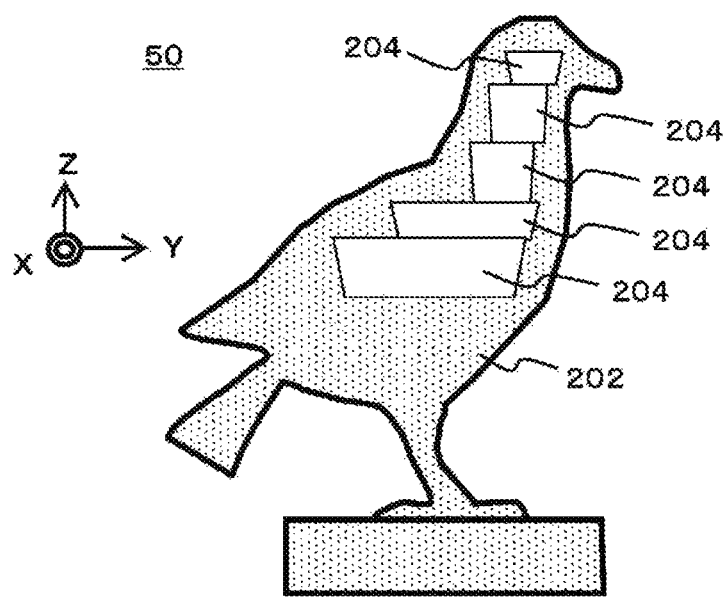
FIGS. 5A and 5B are diagrams for explaining another modification of the shaped object 50.
Figure 5B:
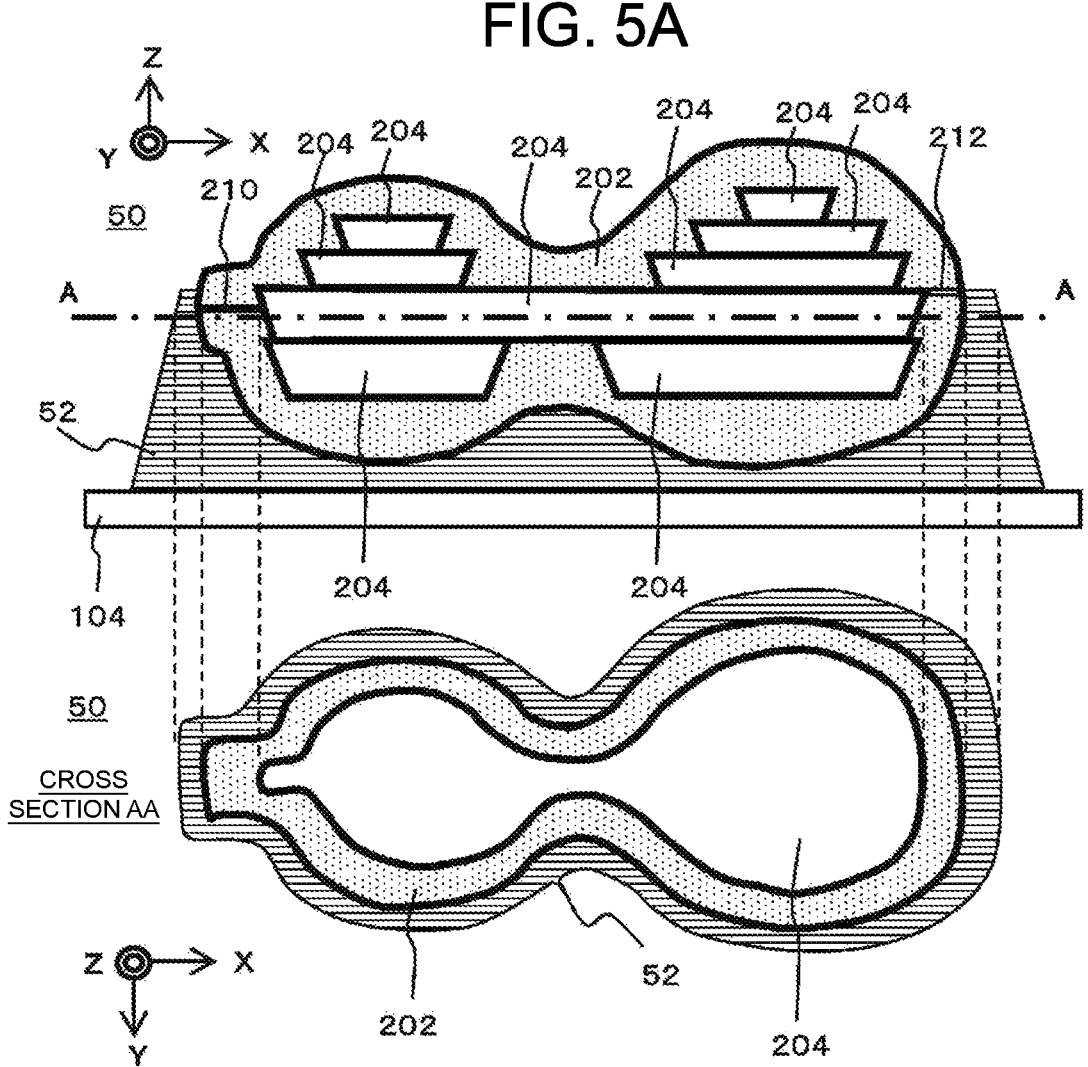

Subsequently, the following describes a modification of the configuration of the empty clearance 204 and the method of forming the clearance 204. FIGS. 5A and 5B are diagrams for explaining another modification of the shaped object 50, and illustrate an example of the configuration of the clearance 204 and the method of forming the clearance 204 in a case of forming the empty clearance 204 without using the lid 60 (refer to FIGS. 1A to 1C). FIG. 5A illustrates a configuration example of the shaped object 50 according to this modification. FIG. 5B illustrates another example of the configuration of the shaped object 50 according to this modification.

Except the points described below, in FIGS. 5A and 5B, a component denoted by the same reference numeral as that in FIGS. 1A to 4C may have a characteristic that is the same as or similar to that of the component in FIGS. 1A to 4C. In FIGS. 5A and 5B, FIG. 5A is a diagram illustrating the configuration of the shaped object 50 in a more simplified manner, and illustrates an example of a configuration of a cross section orthogonal to the sub-scanning direction of the shaped object 50 as an example. FIG. 5B is a diagram illustrating the configuration of the shaped object 50 including a more detailed portion than FIG. 5A, and illustrates an example of a configuration of a cross section orthogonal to the main scanning direction and a configuration of a cross section orthogonal to the deposition direction of the shaped object 50 having a pear shape that is different from the shape of the shaped object 50 illustrated in FIG. 5A. For convenience of illustration, FIGS. 5A and 5B illustrate only empty clearances 204 as clearances 204 within the shaped object 50. However, in another modification of the configuration of the shaped object 50, the clearance 204 including the filler arranged therein may be further formed similarly to the shaped object 50 illustrated in FIGS. 2A to 2C, for example.

In this modification, the empty clearance 204 is formed without using the lid and the like for blocking the opening of the clearance 204. In this case, filling material as a substance different from the ink used as the deposition material is used, the clearance 204 is temporarily filled with the filling material in the middle of the shaping operation, and the filling material is removed thereafter to form the empty clearance 204 without using the lid. More specifically, in this case, in the operation of shaping the shaped object 50 including the clearance 204 therein by depositing the layer of the ink, for example, the depositing operation is interrupted, and the filling material is filled in the clearance 204 to form the clearance 204 in a state of being filled with the filling material. The ink is further deposited on the filling material in the clearance 204. These operations are repeated as needed. By removing the filling material in the clearance 204 during a period until the shaped object 50 is completed, the shaped object 50 is formed so that the clearance 204 is empty.

In this case, although not illustrated in FIG. 5A, it is preferable to form a hole communicating the inside of the clearance 204 to the outside of the shaped object 50 like a filler discharging hole 212 in FIG. 5B, for example. In this case, the hole such as the filler discharging hole 212 is a through hole passing from a surface of the shaped object 50 through the model part 202 to reach the inside of the clearance 204. With this configuration, for example, the filling material can be appropriately removed through the hole such as the filler discharging hole 212.

In this case, as the filling material, it is preferable to use fluid material that can be removed through the hole, for example. In this case, for example, the fluid material means a substance that keeps fluidity even at the timing when the shaping is completed, differently from the ink and the like used for forming the model part 202. The fluid material may be a substance that keeps fluidity within the clearance 204, for example. More specifically, in this modification, the fluid material is a substance present in a liquid state within the clearance 204. In this case, at the time when the layer of the ink is deposited on the clearance 204, the layer of the ink is deposited on the fluid material in a state of filling the clearance 204 with the fluid material. With this configuration, the clearance 204 to be empty after the fluid material is removed can be appropriately formed.

To appropriately remove the filling material such as the fluid material, as illustrated in FIG. 5B, it is preferable to further form a hole used as an air injection hole 210 in addition to the hole used as the filler discharging hole 212. The air injection hole 210 is a through hole that communicates the outside of the shaped object 50 with the inside of the clearance 204 at a position different from that of the filler discharging hole 212. With this configuration, at the time when the filling material is removed from the clearance 204, the filling material can be more easily and appropriately removed by supplying air through the air injection hole 210 with a pump, for example. To remove the filling material, for example, a side of the filler discharging hole 212 may be suctioned with a syringe and the like. Also in this case, the filling material can be more easily and appropriately removed by causing the air to enter the shaped object 50 from the outside through the air injection hole 210. At the time of removing the filling material, for example, the following processes may be both performed: supplying the air through the air injection hole 210 using a pump and the like; and suctioning the side of the filler discharging hole 212 using a syringe and the like.

The air injection hole 210 and the filler discharging hole 212 are preferably formed not to be conspicuous on the surface of the shaped object 50. In this case, the hole preferably has a minimum required size. The air injection hole 210 and the filler discharging hole 212 may be formed at the time of depositing the layer of the ink similarly to the clearance 204, for example, and may be formed with a drill and the like after the deposition operation is completed.

As the hole used for removing the filling material, two or more holes are preferably formed for the entire shaped object 50 like the air injection hole 210 and the filler discharging hole 212 in FIG. 5B, for example. In this case, as illustrated in FIGS. 5A and 5B, with a configuration in which a plurality of clearances 204 are connected to each other when adjacent clearances 204 are brought into contact with each other, the number of holes formed in the shaped object 50 can be appropriately reduced. In this case, "a plurality of clearances 204 are connected to each other" means, for example, a state in which the filling material can circulate through the clearances 204, for example. In this case, all the empty clearances 204 to be formed in the shaped object 50 are preferably formed to be connected to each other.

In a case of using the fluid material as the filling material, the fluid material needs to be material into which the ink does not sink at the time when the layer of the ink is formed on the fluid material. Thus, as the fluid material, for example, it is preferable to use a substance having a specific gravity larger than the specific gravity of the ink (for example, about 1.1) constituting the model part 202. More specifically, as such fluid material, for example, fluorine-based inert liquid, hydrofluoroether, fluorocarbon, or the like may be used.

The fluid material used as the filling material is preferably material that does not chemically react to the ink constituting the surrounding model part 202 when being brought into contact with the ink, for example. In this case, "does not chemically react to the ink when being brought into contact with the ink" means, for example, not to chemically attack (react to) the ink. As the filling material, for example, it is preferable to use a substance that can be appropriately extracted by using a syringe and the like at the time of removing the filling material through the hole such as the filler discharging hole 212. Considering shaping cost of the shaped object 50 and the like, the fluid material is preferably a substance that can be collected after use and can be reused after filtering, for example.

Even when liquid having a small specific gravity is used as the fluid material, the liquid can be used as the filling material if the liquid has sufficiently high viscosity. In this case, for example, if the fluid material has viscosity with which the ink ejected to an overhanging portion such as a portion above the fluid material can be cured before the ink sinks into the fluid material, the layer of the ink can be appropriately deposited on the fluid material. Thus, a substance as described above can be used as the filling material. More specifically, as such fluid material, for example, water, saturated hydrocarbon (paraffin-base, naphthenic-base, and the like), mineral oil, glycerol, or a mixture and the like thereof may be used. As described later in more detail, in a practical use, water and the like can be preferably used as the fluid material.

As described above, according to this modification, for example, the empty clearance 204 can be appropriately formed inside the shaped object 50. Due to this, for example, the weight of the shaped object 50 can be appropriately reduced. For example, the weight and the center of gravity of the shaped object 50 can be appropriately adjusted. In this case, for example, the use amount of the ink constituting the model part 202 can also be reduced. Due to this, for example, the production cost of the shaped object 50 can be appropriately reduced.

In this modification, the clearance 204 can be formed without using the lid and the like for blocking the opening of the clearance 204. In this case, the shape of the clearance 204 is not required to be matched with the shape of the lid, for example. Thus, according to this modification, the clearances 204 having various shapes can be formed corresponding to the shape of the shaped object 50, for example. Accordingly, in a case of shaping the shaped objects 50 having various shapes, the empty clearance 204 can be more appropriately formed therein.

Also in this case, it is preferable to form the wall surface surrounding the clearance 204 not to overhang at an angle smaller than 90 degrees with respect to a surface of the deposited ink. With this configuration, the operation of forming the clearance 204 can be more easily and appropriately performed. The position at which the clearance 204 is formed within the shaped object 50 may be determined in accordance with the weight and the orientation of the center of gravity that have been set similarly to the case described above with reference to FIGS. 1A to 4C, for example. In this case, to stabilize the shaped object 50 (lowering the center of gravity), it is preferable not to form the clearance 204 at a position on a lower side of the gravity direction (lower position) when the shaped object 50 is arranged.

Filling of the filling material (fluid material) in the clearance 204 performed at the time of shaping the shaped object 50 may be automatically performed with a device (automatic system), or may be manually performed through an operation by the manipulator (manual system), for example. In a case of performing filling using the automatic system, the shaped object 50 may be formed by using the shaping device 12 having a function of filling the filling material.

Figure 6:
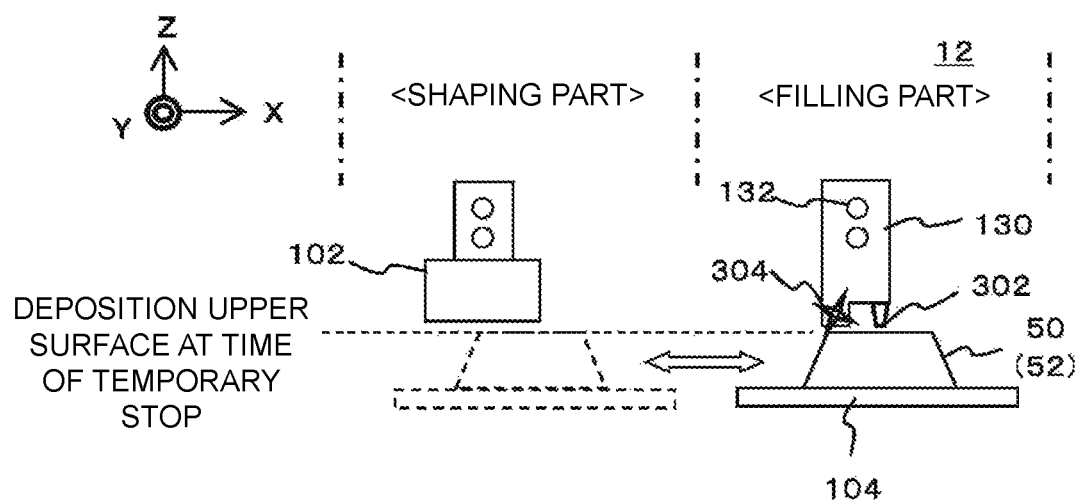
FIG. 6 is a diagram illustrating a modification of the configuration of the shaping device 12.

FIG. 6 is a diagram illustrating a modification of the configuration of the shaping device 12, and illustrates a configuration example of the shaping device 12 having the function of filling the filling material. Except the points described below, in FIG. 6, a component denoted by the same reference numeral as that in FIGS. 1A to 5B may have a characteristic that is the same as or similar to that of the component in FIGS. 1A to 5B. For example except the points described below, the shaping device 12 illustrated in FIG. 6 may have a characteristic that is the same as or similar to that of the shaping device 12 illustrated in FIGS. 1A to 1C. The shaping device 12 illustrated in FIG. 6 may further include components that are the same as or similar to those of the shaping device 12 in FIGS. 1A to 1C in addition to the components illustrated in the drawing.

In this modification, the shaping device 12 includes a filling unit 130 and a guide bar 132 as a configuration for filling the filling material (fluid material) in addition to the head part 102 and the like used for forming the layer of the ink. The filling unit 130 is an ejection device that ejects the filling material with a function of an ink-jet head or a dispenser, for example, and includes an ejection nozzle 302 or a blade 304. The ejection nozzle 302 is an ejection port for ejecting the filling material, and ejects the filling material in a liquid state the amount of which is required for filling the clearance 204, for example, to each clearance 204 (refer to FIGS. 5A and 5B).

The blade 304 is a member for removing excessive filling material after the filling material is filled in the clearance 204. In this modification, the blade 304 is a soft silicone rubber blade that does not at least damage an upper surface of the deposited layer of the ink, and removes the excessive filling material overflowed from the clearance 204 by performing a squeegee operation at the position of the opening of the clearance 204. More specifically, in the configuration illustrated in the drawing, the blade 304 is a rotary blade having four blades using four silicone rubber blades. In this case, the squeegee operation is performed by moving the shaping table 104 in the left direction in the drawing in parallel with the sub-scanning direction while CCW (counterclockwise direction)—rotating the blade 304, for example.

At the time of filling the filling material, a process of the squeegee performed by using the blade 304 may be omitted if a filling amount can be precisely controlled. In this case, a required degree of precision is determined, for example, depending on a rate of removal amount at the time when the ink used for shaping is planarized (planarizing removal rate of shaping material), thickness of one layer of the ink, and the capacity of the clearance 204. The guide bar 132 is a guide member that guides movement of the filling unit 130 in the main scanning direction. By moving the filling unit 130 along the guide bar 132, the filling material can be appropriately filled in the clearances 204 formed at various positions in the shaped object 50.

In this modification, filling of the filling material is performed by temporarily interrupting deposition of the layer of the ink. More specifically, in this case, in the middle of the shaping operation performed by the head part 102 in the shaping part of the shaping device 12, a signal indicating end of formation of the clearance 204 (clearance formation end signal) is generated at the timing when, for example, formation of one clearance 204 is ended. The operation of depositing the ink is temporarily stopped based on the clearance formation end signal, and the shaping table 104 is moved from the shaping part to the filling part. In the filling part, the filling material is ejected from the ejection nozzle 302 of the filling unit 130 to automatically fill the filling material in the clearance 204. With this configuration, for example, the filling material can be appropriately filled before an overhanging layer of the ink is formed on the clearance 204.

After filling in the clearance 204 is performed, the shaping table 104 is returned to the shaping part, and the layer of the ink is further formed on the filling material in the clearance 204. In this case, the ink ejected from the ink-jet head of the head part 102 flies in a direction corresponding to a lower side of the drawing in parallel with the Z-direction to land on (adhere to) the filling material in the clearance 204. In this case, by quickly emitting ultraviolet rays after the landing to cure the ink, the layer of the ink can be appropriately formed on the clearance 204.

In this case, for example, by removing the filling material in the clearance 204 after all layers of the ink constituting the shaped object 50 are formed, the empty clearance 204 is formed in the shaped object 50. With this configuration, for example, the shaped object 50 including the empty clearance 204 inside can be appropriately shaped while automatically filling the filling material.

At the time of filling the filling material, the filling is preferably performed so that an upper surface (liquid surface) of the filling material in the clearance 204 does not exceed a deposition upper surface at the time of temporary stop as an upper surface of the layer of the ink that has been formed before the filling is performed. With this configuration, excessive filling material can be appropriately prevented from overflowing to the outside of the clearance 204, for example. In this case, for example, the filling may be performed while detecting the position of the upper surface of the filling material with an optical sensor and the like, and the filling may be stopped at the timing when the deposition upper surface at the time of temporary stop is reached. With this configuration, the filling material can be filled more appropriately with high accuracy.

In this case, even if the filling material is not filled to reach the same height as that of the deposition upper surface at the time of temporary stop, the layer of the ink can be appropriately formed on the filling material when the filling material is filled to reach a position that is sufficiently close to the deposition upper surface at the time of temporary stop. Thus, at the time when the filling of the filling material is completed, the position of the upper surface of the filling material may be lower than the deposition upper surface at the time of temporary stop. More specifically, for example, depending on the capacity of the clearance 204, when a difference between the position of the upper surface of the filling material at the time when the filling is completed and the deposition upper surface at the time of temporary stop is equal to or smaller than about 1 mm, for example, the difference can be buried (compensated) with the amount of the ink to be removed in planarizing (planarizing removal amount) at the time of deposition of the layer of the ink to be performed thereafter.

The filling operation as described above in this modification can be considered to be an operation of filling the filling material in the clearance 204 every time when the clearance 204 is formed in the shaped object 50 being shaped, for example. In this case, "filling the filling material every time when the clearance 204 is formed" means, for example, to fill the filling material at the timing of forming all layers surrounding the clearance 204 at the time of forming the layer of the ink surrounding the clearance 204.

In another modification, the filling material may be filled in each clearance 204 even at the time before one clearance 204 is completed. In this case, for example, the filling operation may be performed every time when a plurality of layers of the ink set in advance are formed at the time of forming the layer of the ink surrounding the clearance 204. In this case, for example, the filling operation may be performed at a timing corresponding to the shape of the clearance 204. More specifically, for example, in a case of forming the clearance 204 surrounded by wall surfaces including an overhanging shape, the filling operation may be performed at the timing when the overhanging shape of the wall surface is generated. Depending on quality required for shaping and the like, the filling operation may be performed every time when one layer of the ink is formed at the time of forming the layer of the ink surrounding the clearance 204.

As described above, the operation of filling the filling material in the clearance 204 may be performed by using the manual system. Also in this case, for example, filling of the filling material is performed by temporarily stopping the operation of depositing the layer of the ink every time when one clearance 204 is formed. In this case, temporary stop may be performed by monitoring the depositing operation by the manipulator, or may be automatically performed by generating the clearance formation end signal. In this case, for example, the shaping device 12 has a function of temporarily stopping the deposition of the layer of the ink in accordance with an instruction from the manipulator or the clearance formation end signal. In a case in which temporary stop is automatically performed, the shaping device 12 preferably has a function for requesting the manipulator to perform the operation of filling the filling material.

In a case of manually performing the filling, the manipulator fills the filling material in the clearance 204 using a syringe, for example. In this case, it is preferable to inject a slightly large amount of filling material, and squeegee the deposition upper layer at the time of temporary stop with a soft blade and the like to remove excessive filling material. After the filling is performed, deposition is started again on the layer of the ink at which the deposition is temporarily stopped.

Figure 7A:
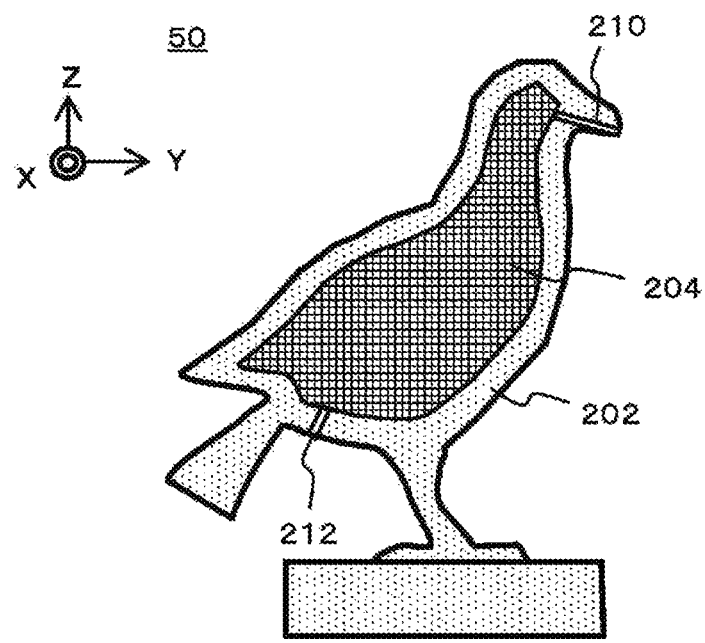
FIGS. 7A and 7B are diagrams illustrating another modification of the configuration of the shaped object 50.
Figure 7B:
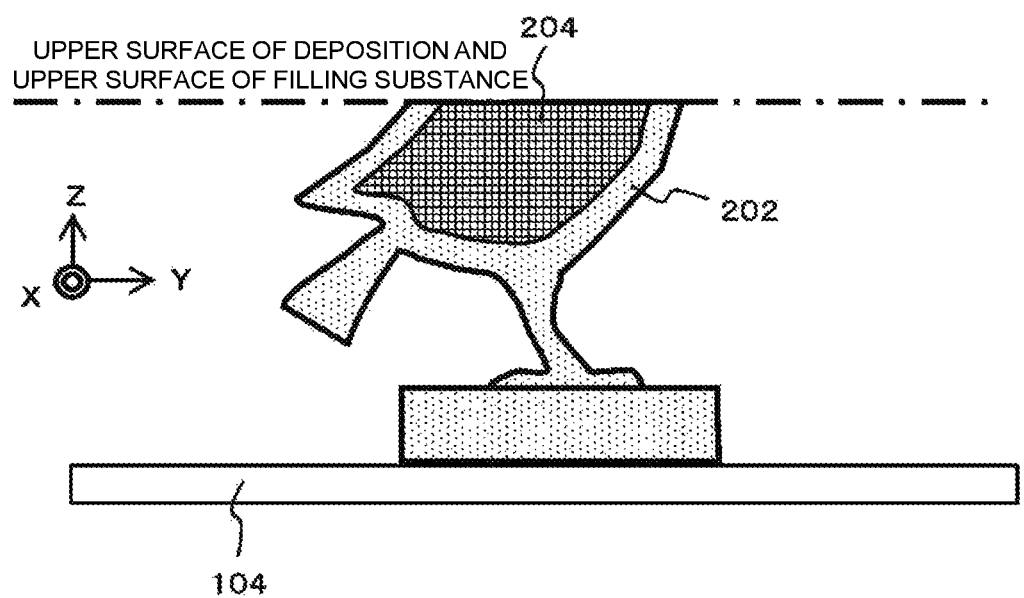

Subsequently, the following describes another modification of the configuration of the shaped object 50. FIGS. 7A and 7B are diagrams illustrating another modification of the configuration of the shaped object 50. FIG. 7A illustrates a configuration of a cross section orthogonal to the sub-scanning direction of the shaped object 50 according to this modification. FIG. 7B is a cross-sectional view illustrating the shaped object 50 in the middle of the shaping process. Except the points described below, in FIGS. 7A and 7B, a component denoted by the same reference numeral as that in FIGS. 1A to 6 may have a characteristic that is the same as or similar to that of the component in FIGS. 1A to 6.

Also in this modification, the shaped object 50 including the empty clearance 204 therein is shaped by filling the filling material such as the fluid material in the clearance 204 in the middle of the shaping process, and removing the filling material thereafter. In this case, as described above in relation to FIG. 6, the clearance 204 is not required to be formed to be matched with the shape of the lid, for example, so that the clearances 204 having various shapes can be formed. Thus, in this modification, the shaped object 50 is shaped such that only a portion along an outer peripheral surface of the shaped object 50 is caused to be the model part 202, and the other portion is caused to be the clearance 204. In this case, as illustrated in the drawing, only a portion having a predetermined thickness along the surface of the shaped object 50 is caused to be the model part 202. In this case, the thickness means a thickness in a normal direction orthogonal to the surface of the shaped object 50. In this case, the entire inner part of the model part 202 along the surface of the shaped object 50 is the clearance 204. According to this modification, for example, the weight of the shaped object 50 can be significantly reduced. The use amount of the ink used for shaping can also be significantly reduced, and the shaping cost of the shaped object 50 can be appropriately suppressed.

In a case of forming the shaped object 50 as described above, the wall surfaces surrounding the clearance 204 incline at various angles. More specifically, in a case of shaping the shaped object 50 as illustrated in FIGS. 7A and 7B, for example, at least part of the wall surfaces surrounding the clearance 204 has an overhanging shape. Thus, in this case, the filling material is filled in the clearance 204 in parallel with the depositing operation of the layer of the ink to form the model part 202 while the upper surface of the deposited layer of the ink (an upper surface of deposition) is preferably always matched with an upper surface of the filled filling material (an upper surface of a filling substance) as illustrated in FIG. 7B, for example. With this configuration, the clearances 204 having various shapes can be appropriately formed. Also in this case, by forming the air injection hole 210 and the filler discharging hole 212 as through holes communicating the clearance 204 with the outside of the shaped object 50, for example, the filling material once filled in the clearance 204 can be appropriately removed.

Another modification can be considered for the configuration of the shaped object 50, the shaping operation of shaping the shaped object 50, the configuration of the shaping device, and the like. For example, in the above description, described is a case of removing the filling material from all of the clearances 204 with reference to FIGS. 6 to 7B. However, in the modification of the configuration of the shaped object 50, for example, there may be a case in which the filling material is not removed from some of the clearances 204 to be kept being filled with the filling material.

In the above description, mainly described is a case of using the fluid material such as liquid as the filling material. However, material other than liquid may be used as the filling material. In this case, for example, filling material that is a solid at the time of filling and is liquefied or vaporized depending on a predetermined condition may be used. More specifically, a substance that sublimes from a solid state to a gas state, like dry ice, for example, may be used as the filling material. In a case of using the filling material that is liquid at the time of filling, for example, the filling material may be vaporized to be removed.

Figure 8:
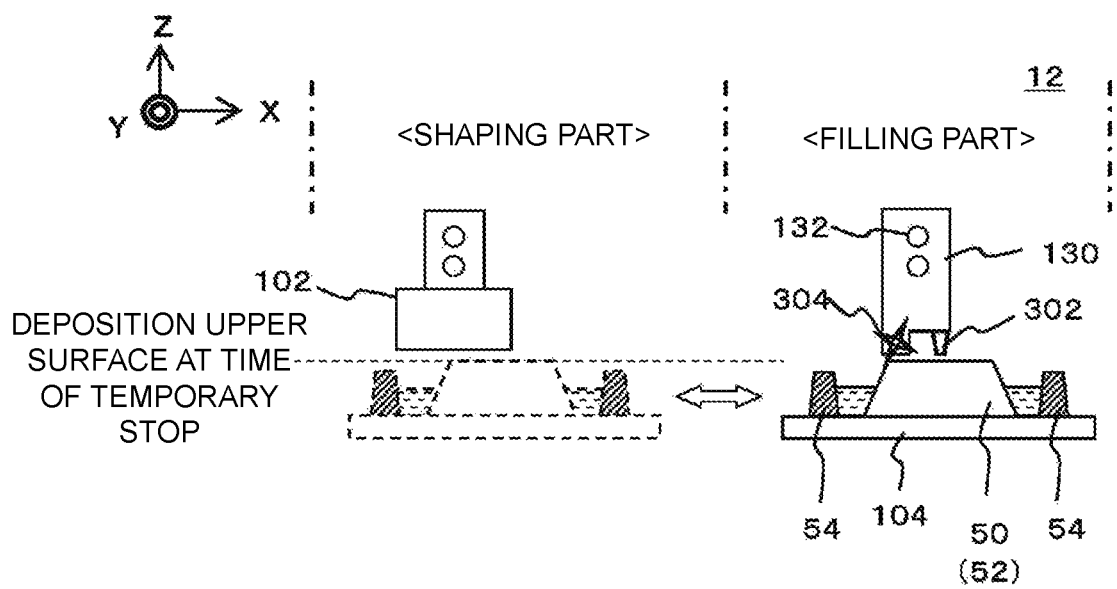
FIG. 8 is a diagram illustrating another modification of the shaping operation of shaping the shaped object 50.

Subsequently, the following describes another modification of the shaping operation of shaping the shaped object 50 and the configuration of the shaping device 12. FIG. 8 is a diagram illustrating another modification of the shaping operation of shaping the shaped object 50, and illustrates a modification of the method of shaping the shaped object 50 in a case of performing the shaping using the shaping device 12 having a configuration that is the same as or similar to that in the case illustrated in FIG. 6. Except the points described below, in FIG. 8, a component denoted by the same reference numeral as that in FIGS. 1A to 7B may have a characteristic that is the same as or similar to that of the component in FIGS. 1A to 7B.

As described above, in the shaping operation described with reference to FIG. 6, the fluid material in a liquid state is ejected from the filling unit 130 as the filling material to fill the clearance of the shaped object 50. Due to this, for example, the fluid material is caused to function as the support layer in the clearance, and the layer of the ink overhanging the clearance is formed. Also in a case illustrated in FIG. 8, the same or similar processes are performed to perform the shaping operation. In the modification of the shaping operation illustrated in FIG. 8, to prevent the fluid material from widely spreading over the shaping table 104 when the fluid material overflows the clearance due to an overflow from the clearance, for example, a wall part 54 is further formed on the shaping table 104. Accordingly, when the fluid material overflows the clearance, the fluid material is stored in a region surrounded by the wall part 54.

More specifically, in this modification, as illustrated in the drawing for example, the wall part 54 is formed for holding the overflowed fluid material on the shaping table 104. The wall part 54 may be considered to be a configuration for preventing the fluid material from overflowing from the shaping table 104, for example. The wall part 54 may be considered to be a configuration for holding the overflowed fluid material, for example. In this case, at an early stage of the operation of shaping the shaped object 50, for example, the wall part 54 surrounding the shaped object 50 being shaped is formed on the shaping table 104 in parallel with the shaping of the shaped object 50 (at the same time as the shaping of the shaped object 50). In this case, the wall part 54 is formed on the shaping table 104 to surround the shaped object 50 and the support layer 52 in a state in which a gap is made between the wall part 54, and the shaped object 50 and the support layer 52 to store the fluid material between the wall part 54, and the shaped object 50 and the support layer 52. The phrase of "surround the shaped object 50 and the support layer 52" means, for example, to surround an outer side of the support layer 52 formed on an outer side of the shaped object 50.

With this configuration, the fluid material overflowed from the clearance does not widely spread over the shaping table 104, and is stored between the shaped object 50 and the wall part 54 within the region surrounded by the wall parts 54. Accordingly, with this configuration, even when the fluid material overflows the clearance, for example, influence on the surroundings can be appropriately suppressed. In this case, after the process of shaping the shaped object 50 performed by the shaping device 12 is completed (after the deposition operation is completed), only fluid material within a range surrounded by the wall parts 54 may be removed by suction with a pipette, for example, before or after the shaped object 50 and the support layer 52 are peeled off from the shaping table 104 to clean the shaping table 104.

For example, the fluid material may be removed by wiping with a cloth. After most of the fluid material is removed with a pipette and the like, wiping may be performed with a cloth. By breaking the wall parts 54 after the fluid material is removed, for example, the wall parts 54 can be easily and appropriately removed from the shaping table 104. Thus, according to this modification, for example, the shaping operation performed by using the fluid material can be more appropriately performed.

The shaped object 50 and the support layer 52 are preferably peeled off after the wall part 54 is removed, for example. With this configuration, for example, a peeling operation can be more easily performed in a state in which an unneeded surrounding object (the wall part 54) is not present. The height (height in the deposition direction) of the wall part 54 may be a height (required height) with which overflowed fluid material does not leak out to the outside of the wall part 54. Thus, as illustrated in the drawing, for example, the height of the wall part 54 may be lower than that of the shaped object 50. The wall part 54 may be formed with any material (ink) used for forming the support layer 52 and the shaped object 50. More specifically, for example, the wall part 54 may be formed with ink (support member) used as the material of the support layer 52. The wall part 54 may be formed with any ink used for shaping the shaped object 50. In this case, for example, the wall part 54 may be formed by using any of the ink dedicated for shaping (model material, shaping material ink) used for forming the inner part of the shaped object 50, clear ink, and ink for coloring (decoration ink, color ink), or such a plurality of types of ink. The wall part 54 may be formed, for example, by using both of the support member and the ink used for shaping the shaped object 50.

As described above in relation to FIG. 6, in a case of filling the fluid material in the clearance of the shaped object 50, control may be performed so that the upper surface (liquid surface) of the fluid material within the clearance does not exceed the deposition upper surface to prevent the fluid material from overflowing the clearance. However, depending on quality and the like required for the shaping, it may be preferable to fill as much fluid material as possible in the clearance in some cases. In such a case, when the clearance is almost completely filled, typically, the surface slightly rises due to surface tension. In this case, to prevent the fluid material in the clearance from running short, for example, a larger amount of fluid material than a minimum required amount may be ejected. In such a case, excessive fluid material exceeding a deposition surface in the middle of the deposition operation overflows the clearance to flow out from the upper surface of the shaped object 50 being shaped due to an operation and the like of the blade 304 of the filling unit 130. As a result, the amount of fluid material overflowing onto the shaping table 104 being shaped may be increased. According to this modification, for example, even when the amount of fluid material overflowing onto the shaping table 104 is increased, the overflowed fluid material can be appropriately stored in a certain region.

In the above description, mainly described is the configuration and the operation in a case of ejecting the fluid material using the filling unit 130 different from the head part 102 with reference to FIGS. 6 and 8, for example. However, in another modification of the configuration of the shaping device 12, for example, the fluid material may be ejected with the configuration in the head part 102.

Figure 9A:
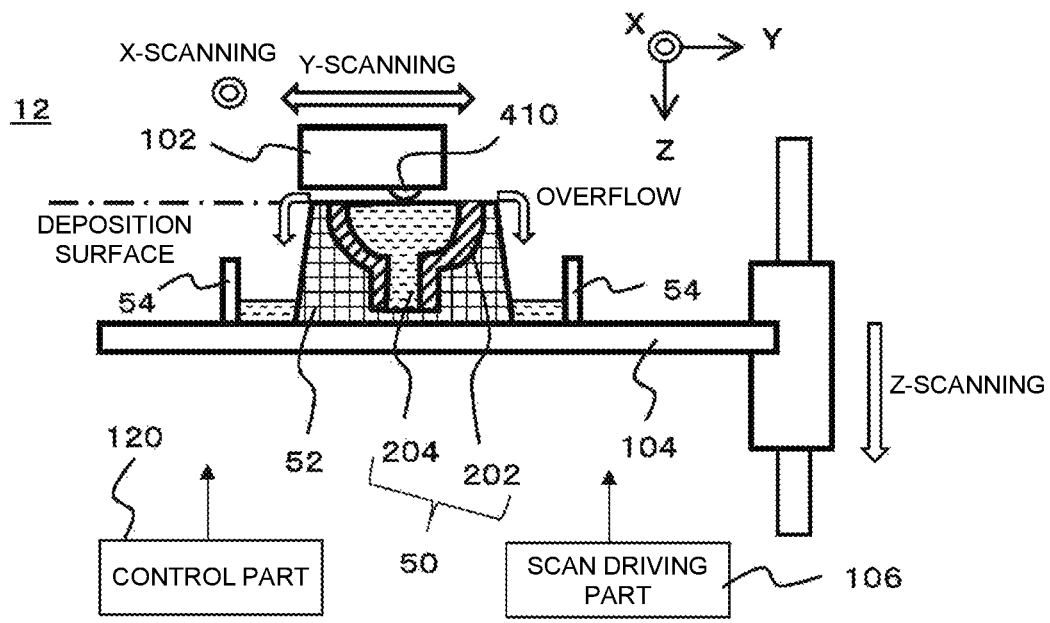
FIGS. 9A to 9C are diagrams for explaining another modification of the configuration of the shaping device 12.
Figure 9B:
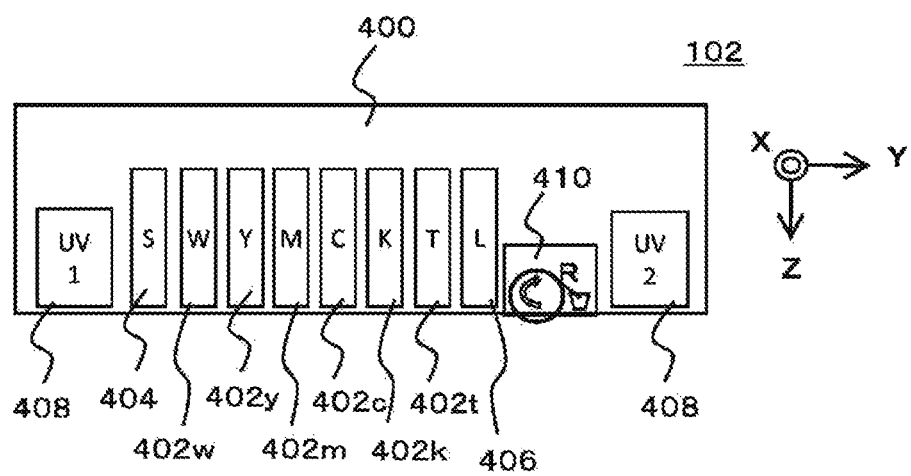
Figure 9C:
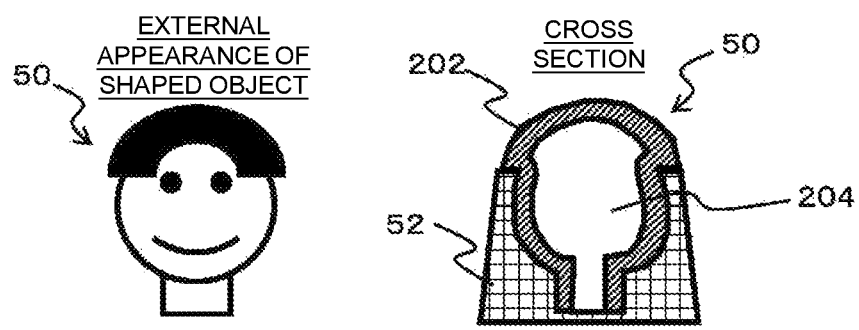

FIGS. 9A to 9C are diagrams for explaining another modification of the configuration of the shaping device 12. FIG. 9A illustrates a configuration example of the shaping device 12 according to this modification. FIG. 9B illustrates a configuration example of the head part 102 of the shaping device 12. FIG. 9C illustrates a configuration example of the shaped object 50 shaped in this modification. Except the points described below, in FIGS. 9A to 9C, a component denoted by the same reference numeral as that in FIGS. 1A to 8 may have a characteristic that is the same as or similar to that of the component in FIGS. 1A to 8.

As described above with reference to FIGS. 6 and 8, for example, in a case of ejecting the fluid material using the filling unit 130 (refer to FIG. 6), the operation of depositing the ink may be temporarily stopped to eject the fluid material. However, in this case, when the number of times when the shaping is temporarily stopped is increased, time required for shaping may be significantly increased. In this modification, by ejecting the fluid material with the configuration in the head part 102, the fluid material is further ejected during the main scanning operation for forming the layer of the ink, for example, without temporarily stopping the operation of depositing the ink constituting the shaped object 50.

More specifically, in this modification, the shaping device 12 includes the head part 102 that can eject the fluid material. The head part 102 includes a carriage 400, a plurality of ink-jet heads, a plurality of ultraviolet light sources 408, and a planarizing zing roller 410. The carriage 400 is a holding member that holds each component of the head part 102. In this example, the head part 102 includes, as a plurality of ink-jet heads, an ink-jet head 402w, an ink-jet head 402y, an ink-jet head 402m, an ink-jet head 402c, an ink jet head 402k, an ink-jet head 402t, an ink jet head 404, and an ink jet head 406. These ink-jet heads are, for example, arranged in the main scanning direction while positions thereof are aligned in the sub-scanning direction.

Among these ink-jet heads, the ink-jet head 402w, the ink-jet head 402y, the ink-jet head 402m, the ink-jet head 402c, the ink-jet head 402k, and the ink-jet head 402t (hereinafter, referred to as ink-jet heads 402w to 402t) are ink jet heads that eject the ink used as the material of the shaped object 50, and eject the ink of different colors. More specifically, the ink-jet head 402w ejects ink of white color (W color). The ink-jet head 402y ejects ink of yellow color (Y color). The ink jet head 402m ejects ink of magenta color (M color). The ink-jet head 402c ejects ink of cyan color (C color). The ink-jet head 402k ejects ink of black color (K color). The ink-jet head 402t ejects clear ink. In this case, the clear ink means, for example, ink of clear color as a colorless transparent color (T).

Among the ink-jet heads included in the head part 102, the ink-jet head 404 ejects the ink used as the support member as the material of the support layer 52. As the support member, for example, known material for the support layer can be preferably used. As the ink-jet head 404, for example, an ink-jet head that is the same as or similar to the ink-jet heads 402w to 402t can be preferably used. The ink-jet head 406 is an ink-jet head that ejects the fluid material. The ink-jet head 406 ejects, for example, the fluid material in parallel with the shaping operation during the shaping of the shaped object 50 by ejecting the fluid material during the main scanning operation, for example. As the ink-jet head 406, for example, an ink-jet head that is the same as or similar to the ink-jet heads 402w to 402t can also be preferably used.

In this modification, the head part 102 includes the ink-jet head 406, so that the fluid material is ejected by the configuration in the head part 102. For example, the head part 102 according to this modification may be considered to be a configuration obtained by adding the ink-jet head 406 to the head part 102 in the configuration illustrated in FIGS. 1A to 8.

The ultraviolet light sources 408 are light sources (UV light sources) for curing the ink, and generate ultraviolet rays for curing ultraviolet curable ink. In this example, the respective ultraviolet light sources 408 are arranged on one end side and the other end side of the main scanning direction of the head part 102 across a line of ink-jet heads. As the ultraviolet light source 408, for example, an UVLED (ultraviolet LED) can be preferably used. The planarizing roller 410 is a planarizing module for planarizing the layer of the ink formed during the shaping process of the shaped object 50. The planarizing roller 410 planarizes the layer of the ink by being in contact with the surface of the layer of the ink to remove part of the ink before curing during the main scanning operation, for example. In this modification, the planarizing roller 410 also functions as a configuration of removing excessive fluid material exceeding the deposition surface in the clearance of the shaped object 50 in the middle of the depositing operation. In this case, for example, excessive fluid material may be removed together with the ink through the operation of planarizing the layer of the ink. Similarly to the blade 304 of the filling unit 130 illustrated in FIG. 8, for example, excessive fluid material may be squeezed out from the deposition surface by the planarizing roller 410.

With this configuration, the fluid material can be ejected as part of the function of the shaping part without arranging the filling part and the like in addition to the shaping part in which the shaping is performed by the head part 102. Thus, according to this modification, for example, the configuration of the shaping device 12 can be more simplified and downsized. In this case, as described above, the fluid material can be filled in the clearance of the shaped object 50 without temporarily stopping the operation of depositing the ink. Thus, according to this modification, the time required for shaping can be prevented from being increased due to temporary stop. Accordingly, for example, the shaped object 50 can be shaped more efficiently.

In this case, the shaping is not required to be temporarily stopped at the timing when the fluid material is ejected into the clearance, so that the clearance can be formed with a higher degree of freedom, for example. Thus, according to this modification, for example, a degree of freedom of the shape or the number of clearances to be formed can be further improved. In this case, by ejecting the fluid material using the ink-jet head, an ejection amount and an ejection position of the fluid material can be controlled more precisely. Accordingly, for example, the clearances having various shapes can be more appropriately formed.

In this case, as illustrated in FIG. 9C for example, the clearance 204 matched with the shape of the shaped object 50 can be formed with higher accuracy, for example. More specifically, the left figure in FIG. 9C illustrates an example of an external appearance of the completed shaped object 50 (external appearance of the shaped object). The right figure illustrates a state of a cross section of the shaped object 50 together with a cross section of the support layer 52. The shaped object 50 illustrated in FIG. 9C can be considered to be a modification of the shape of the shaped object 50. Also in this case, similarly to the shaped object 50 illustrated in FIGS. 7A and 7B for example, the shaped object 50 includes the model part 202 and the clearance 204. In this case, the clearance 204 in the shaped object 50 is formed by using the fluid material ejected from the ink-jet head 406 of the head part 102, for example. More specifically, in this case, at the time of shaping the shaped object 50, by forming the surrounding model part 202 in a state in which the fluid material is filled in a region in which the clearance 204 should be formed, the shaped object 50 including the model part 202 and the clearance 204 is shaped. In this case, the fluid material filled in the clearance 204 may be extracted from the shaped object 50 by the time when all the processes related to the shaping are completed. In this case, for example, a hole may be formed on part of the surface of the shaped object 50, and the fluid material may be extracted through the hole. Depending on the use and required quality and the like of the shaped object 50, all the processes related to the shaping of the shaped object 50 may be completed in a state in which the fluid material is kept being filled in the clearance 204.

In the respective configurations described above, as the material of the support layer 52 outside the shaped object 50 (outside support member), used is a support member in a solid state that supports the model part 202. More specifically, as such a support member, ultraviolet curable ink including an ultraviolet curable resin may be used, for example. In a case of forming the clearance 204 in the shaped object 50 using the fluid material as in the respective configurations described above, the fluid material to be filled in the clearance 204 can be considered to be material constituting a support part (fluid support member) supporting the surrounding model part 202 within the clearance 204, for example. In this case, the configuration of filling the fluid material in the clearance 204 within the shaped object 50 can be considered to be a configuration of using the fluid material as the support member for the clearance 204 within the shaped object 50, and using the ultraviolet curable ink as the support member for the outside of the shaped object 50, for example.

In another modification of the shaping operation and the configuration of the shaping device 12, the fluid material may also be used as the support member for supporting the shaped object 50 (model part 202) on the outside of the shaped object 50, for example. In this case, for example, the shaped object 50 may be shaped by using a liquid storage container 500 having a water tank shape.

Figure 10A:
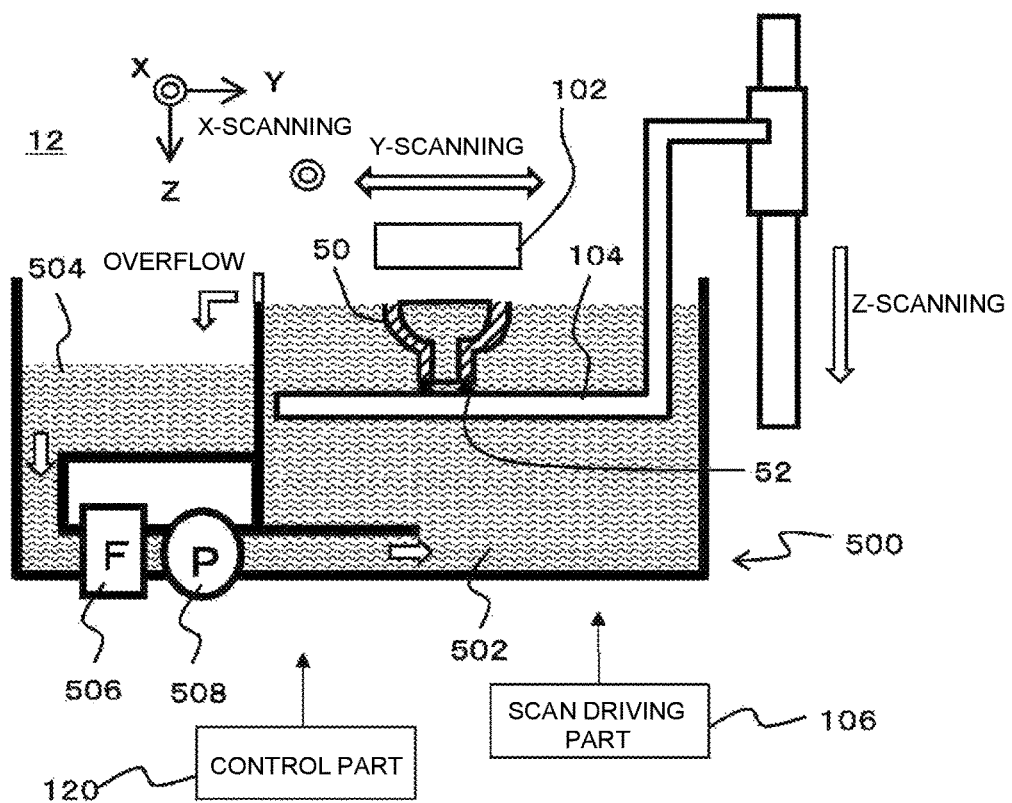
FIGS. 10A to 10C are diagrams for explaining another modification of the shaping operation and the configuration of the shaping device 12.
Figure 10B:
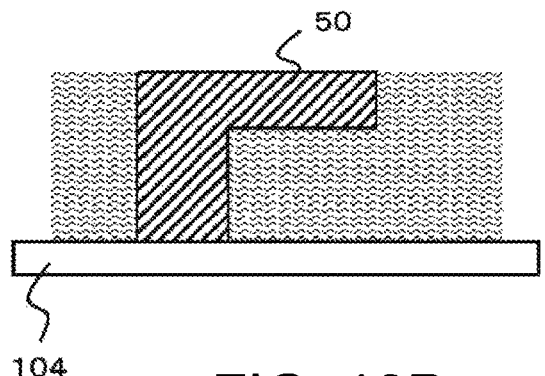
Figure 10C:
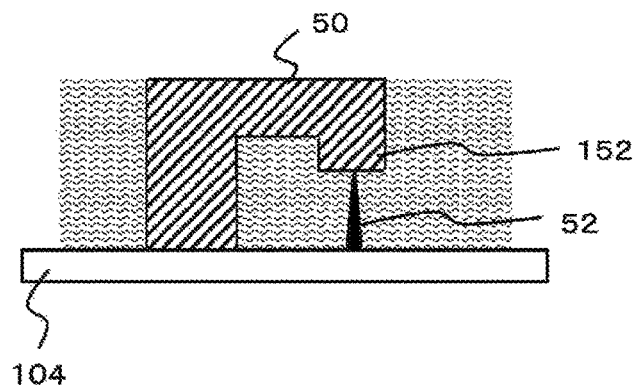

FIGS. 10A to 10C are diagrams for explaining another modification of the shaping operation and the configuration of the shaping device 12. FIG. 10A illustrates a configuration example of the shaping device 12 according to this modification. Except the points described below, in FIGS. 10A to 10C, a component denoted by the same reference numeral as that in FIGS. 1A to 9C may have a characteristic that is the same as or similar to that of the component in FIGS. 1A to 9C.

In this modification, for example, the shaping device 12 further includes the liquid storage container 500 in addition to the configuration of the shaping device 12 illustrated in FIG. 9A. The liquid storage container 500 is a container having a water tank shape for storing liquid, and includes a first liquid chamber 502, a second liquid chamber 504, a filter 506, and a pump 508. The first liquid chamber 502 is a liquid chamber for immersing the shaped object 50 being shaped in liquid. The first liquid chamber 502 is a liquid chamber having a size that can house the shaping table 104 therein, arranged at a position opposed to the head part 102 across the shaping table 104, and houses the shaping table 104 having an upper surface on which the shaped object 50 being shaped is placed to immerse the shaped object 50 in the liquid within the first liquid chamber 502 together with the shaping table 104. In this modification, the liquid surface of the first liquid chamber 502 is always maintained at a position lower than a lower surface of the head part 102 and matched with the deposition surface being shaped due to overflow as illustrated in the drawing. The height of the liquid surface (position of the liquid surface) of the first liquid chamber 502 can be set, for example, by adjusting a height of an outlet at which the liquid overflows. In this case, the shaping device 12 gradually changes the position of the shaping table 104 in the deposition direction (depth direction of the liquid) corresponding to a deposition height in accordance with progress of the shaping operation, and moves the shaping table 104 to a deep position in the first liquid chamber 502.

The second liquid chamber 504 is a liquid chamber that stores liquid overflowed from the first liquid chamber 502 due to overflow of the first liquid chamber 502. The position of the liquid surface of the second liquid chamber 504 is adjusted to be lower than the position of the liquid surface of the first liquid chamber 502 as illustrated in the drawing, for example. In this modification, the first liquid chamber 502 is connected to the second liquid chamber 504 via the filter 506 and the pump 508. The filter 506 is a filter that filters liquid flowing from the second liquid chamber 504 to the first liquid chamber 502. The pump 508 is a pump for causing the liquid to flow from the second liquid chamber 504 toward the first liquid chamber 502, and supplies the liquid from the second liquid chamber 504 to the first liquid chamber 502 during at least the shaping process of the shaped object 50. With this configuration, the liquid can be appropriately circulated between the first liquid chamber 502 and the second liquid chamber 504 while filtering the liquid with the filter 506. By supplying the liquid from the second liquid chamber 504 to the first liquid chamber 502 using the pump 508, and causing the liquid overflowing from the first liquid chamber 502 to flow to the second liquid chamber 504, the position of the liquid surface of the first liquid chamber 502 can be appropriately adjusted. In this case, as illustrated in the drawing for example, it is preferable to perform adjustment so that the position of the deposition upper surface is matched with the position of the liquid surface of the liquid within the first liquid chamber 502. By circulating the liquid in this way, for example, the liquid within the liquid storage container 500 can be appropriately reused. When the liquid is contaminated due to a long-term use, for example, it is preferable to discharge the liquid through a waste liquid port (not illustrated) to be replaced with new liquid.

With this configuration, for example, an overhanging portion on an outer peripheral side of the shaped object 50 can be appropriately supported by the liquid within the first liquid chamber 502 without forming a support layer in a solid state. In this case, the support layer in a solid state means, for example, a support layer made of ultraviolet curable ink. Accordingly, in this modification, for example, the shaped objects 50 having various shapes can be appropriately shaped.

As described above, in a case of forming the support layer in a solid state at the time of shaping the shaped object 50, the support layer needs to be removed after the shaping process performed by the shaping device 12 is completed. In this case, much time is required for removing the support layer, and it may become difficult to efficiently shape the shaped object 50 in some cases. The removed support layer may become a waste, and cost for disposal or effort may be required. By contrast, this modification can appropriately prevent such a problem. Thus, according to this modification, for example, the shaped object 50 can be efficiently and appropriately shaped.

Also in this case, by ejecting the fluid material from the head part 102, for example, the clearance can be formed inside the shaped object 50. In this case, even when the fluid material overflows the clearance, for example, the fluid material can be stored in the first liquid chamber 502. Thus, the fluid material can be appropriately managed without forming the wall part 54 (refer to FIGS. 9A to 9C) and the like on the shaping table 104 as described above with reference to FIGS. 9A to 9C, for example.

In this case, liquid originally stored in the first liquid chamber 502 is preferably the same liquid as the fluid material ejected from the head part 102, for example. This configuration can appropriately prevent composition of the liquid within the first liquid chamber 502 from being changed when the fluid material flows in, for example. Depending on a condition required for shaping and the like, liquid different from the fluid material ejected from the head part 102 may be used as the liquid originally stored within the first liquid chamber 502.

In this modification, the shaped object 50 is not necessarily supported by only the liquid within the first liquid chamber 502, and the support layer 52 in a solid state may be further formed. More specifically, as illustrated in the drawing for example, the support layer 52 in a solid state may be formed for supporting part of the shaped object 50. With this configuration, for example, a portion desired to be supported more securely during the shaping process can be supported more securely using the support layer 52 in a solid state. In this case, for example, the support layer 52 may be formed on the shaping table 104 before the shaping of the shaped object 50 is started, and the support layer 52 may support part of the shaped object 50 to be formed thereon.

Depending on the shape of the shaped object 50 to be shaped, the support layer 52 in a solid state may be required to be formed in some cases. FIGS. 10B and 10C illustrate an example of a relation between necessity of the support layer 52 in a solid state and the shape of the shaped object 50. Among these, FIG. 10B illustrates an example of the shape of the shaped object 50 that can be shaped without forming the support layer 52 in a solid state. FIG. 10C illustrates an example of the shape of the shaped object 50 that requires the support layer 52 in a solid state to be formed.

More specifically, the shaped object 50 illustrated in FIG. 10B has a continuously running shape from the bottom on the shaping table 104. In a case of the shaped object 50 having such a shape, the layer of the ink can be appropriately formed by being supported by the liquid (liquid surface) within the first liquid chamber 502 at the time of forming any layer of the ink constituting the shaped object 50. Thus, in this case, the shaped object 50 can be appropriately shaped without forming the support layer 52 in a solid state.

However, in a case of shaping the shaped object 50 illustrated in FIG. 10C, there is a portion indicated as a downwardly projecting part 152 in the drawing, so that the shaped object 50 does not have the continuously running shape from the bottom on the shaping table 104. In a case of shaping such a non-continuous shaped object 50, it is considered that the shaping cannot be appropriately performed only by supporting the layer of the ink during the shaping process with the liquid. More specifically, in this case, a portion included in the downwardly projecting part 152 in the layer of the ink during a forming process is formed in a state of being separated from the other portion continuously running from the bottom on the shaping table 104. In this case, a position of the portion included in the downwardly projecting part 152 is not determined only by forming the layer of the ink on the liquid, and the portion may float on the liquid to flow to an unintended position, for example. Thus, in such a case, as illustrated in the drawing for example, it is preferable to form the support layer 52 in a solid state to be connected to the portion included in the downwardly projecting part 152. With this configuration, for example, the portion included in the downwardly projecting part 152 can be appropriately prevented from flowing to an unintended position. Accordingly, for example, the shaped objects 50 having various shapes can be more appropriately shaped.

Subsequently, the following complementarily explains the operation of forming the clearance in the shaped object 50 using the fluid material, for example. In the above description, as an example of a substance used as the fluid material, for example, water, saturated hydrocarbon (paraffin-base, naphthenic-base, and the like), mineral oil, glycerol, or a mixture thereof may be used. However, other substances may be used as the fluid material so long as the substance satisfies a function required for the fluid material used for shaping.

In this case, examples of the function required for the fluid material may include a function of appropriately curing the ink when the ink used for shaping the shaped object 50 is ejected onto the fluid material. To implement this function, for example, when droplets of the ink are ejected onto the fluid material, the ink needs to go down (sink) in the fluid material within time required for curing the ink, and deterioration or the like needs to be prevented from being caused. More specifically, as the fluid material, for example, (a) a substance having a specific gravity close to or larger than that of the ink, or (b) a substance having high viscosity in which the ink sinks while taking much time, may be used. As the material corresponding to (a), for example, paraffin-based solvent may be used. Fluorine-based inert liquid such as hydrofluoroether and fluorocarbon may be used, for example. As the material corresponding to (b), for example, glycerol, or mixed liquid of glycerol and water may be used.

Considering only a function of supporting the layer of the ink formed on the fluid material, it can be said that a function as the filler for filling the clearance is good when the viscosity is higher, because the ink less sinks therein. However, in this case, in a case of finally extracting the fluid material from the shaped object 50, the extraction may be hardly performed. Thus, the viscosity of the fluid material is preferably adjusted to be suitable viscosity considering an extracting operation and the like. In a case of ejecting the fluid material from the ink-jet head, ejection is hardly performed when the viscosity is high. Thus, in this case, the viscosity of the fluid material is preferably adjusted to be about 1 m to 30 mPa·sec, for example. An additive such as an antiseptic, a surface-active agent, an antioxidant, or a thickener may be added to the fluid material to prevent the fluid material from being deteriorated or to adjust a characteristic, for example.

The specific gravity of the ink (ink droplet) may be larger than that of the fluid material considering a balance with a sinking speed of the ink. Thus, as the fluid material, a saturated hydrocarbon (paraffin-base, naphthenic-base, and the like), mineral oil, and the like may be preferably used as described above, for example, in accordance with a physical property of the ink to be used. Liquid such as silicone oil may also be used.

The inventors of the present disclosure have found that water can be preferably used as the fluid material in a practical use by an experiment and the like. As the water, for example, tap water can be preferably used. In a case of using the water as the fluid material, for example, cost of the fluid material can be significantly reduced. A load and the like on the environment can also be significantly reduced. In this case, the viscosity of the fluid material is sufficiently low, so that the fluid material can be appropriately ejected by using the ink-jet head. As the fluid material, for example, water to which various additives and the like are added may be used. Alternatively, for example, liquid containing water as a principal component may be used.

In the above description, the fluid material is mainly used in a case of forming the clearance in the shaped object 50. However, in another modification of the shaping operation, for example, the clearance may be formed in the support layer by using the fluid material. With this configuration, for example, the use amount of the ultraviolet curable ink and the like used as the material of the support layer can be reduced. Due to this, the shaping cost can be significantly reduced. In this case, by causing part of the support layer to be in a liquid state, for example, the time required for removing the support layer can be reduced. For example, the amount of wastes generated by removing the support layer can also be reduced.

In this case, the ultraviolet curable ink used as the material of the support layer is an example of a support member constituting a solid portion of the support layer (support member for a solid portion). In this case, a relation between the support member for a solid portion and the fluid material may be a relation such that the support member for a solid portion may be gradually dissolved by the fluid material, for example. More specifically, for example, in a case of using water-soluble material as the support member for a solid portion and using water and the like as the fluid material, the solid portion in the support layer is dissolved by the fluid material in a certain degree during the shaping process of the shaped object 50. Thus, with this configuration, for example, the time required for removing the support layer can be more appropriately reduced. In this case, as described above with reference to FIGS. 8 to 9C, for example, by storing the fluid material around the shaped object 50, an outer portion of the support layer can also be dissolved in a certain degree during the shaping process. Thus, with this configuration, the time required for removing the support layer can be further reduced.

What is claimed is:

1. A manufacturing method for a shaped object for manufacturing a three-dimensional shaped object by depositing a layer of shaping material, the manufacturing method comprising:

setting a setting weight of the shaped object to be a weight of a final shaped object after shaping of the shaped object is completed, wherein the setting weight is a weight and center of gravity of at least part of the shaped object and is different from a filling weight that is weight in a case of forming the shaped object by filling a deposition material used for deposition;

generating a weight set data to be supplied to a controller based on a calculation result of a difference between an original data weight and the setting weight, wherein the controller selects a shape and number of clearance required for eliminating the difference between the original data weight and the setting weight from shapes of a plurality of types of clearances stored in the controller in advance;

depositing layers of the deposition material used for deposition to be formed to shape the shaped object including the clearance inside as a region that is not formed with the deposition material;

forming the clearance in a state of being filled with a filling material that is a substance different from the deposition material, wherein the filling material is a fluid material that keeps fluidity within the clearance, the filling material has the same height as that of a deposition upper surface of the deposition material during a shaping process, or an inside of the clearance is filled during the shaping process with a difference of an amount of the deposition material to be removed by planarizing the deposition material;

forming a hole that communicates the inside of the clearance with an outside of the shaped object, wherein as the hole, a filler discharging hole for discharging the fluid material and an air injection hole disposed in a vicinity of a position farthest from the filler discharging hole in the clearance are formed;

further depositing the deposition material on the filling material; and removing the filling material from the clearance through the hole to form the shaped object so that the clearance is empty.

2. The manufacturing method for a shaped object according to claim 1, wherein a substance having a specific gravity larger than a specific gravity of the deposition material is used as the fluid material.

3. A manufacturing method for a shaped object for manufacturing a three-dimensional shaped object by depositing a layer of shaping material, the manufacturing method comprising:

setting a setting weight of the shaped object to be a weight of a final shaped object after shaping of the shaped object is completed, wherein the setting weight is a weight and center of gravity of at least part of the shaped object and is different from a filling weight that is weight in a case of forming the shaped object by filling a deposition material used for deposition;

generating a weight set data to be supplied to a controller based on a calculation result of a difference between an original data weight and the setting weight, wherein the controller selects a shape and number of clearance required for eliminating the difference between the original data weight and the setting weight from shapes of a plurality of types of clearances stored in the controller in advance;

depositing layers of the deposition material used for deposition to be formed to shape the shaped object including the clearance inside as a region that is not twined with the deposition material;

forming the clearance in a state of being filled with a fluid material that keeps fluidity within the clearance, and further depositing the deposition material on the fluid material;

using a shaping table having an upper surface on which the shaped object being shaped is placed;

further forming a wall part surrounding the shaped object being shaped on the shaping table with a gap between the wall part and the shaped object, during shaping the shaped object;

the wall part being formed by using the deposition material at the same time as the shaping of the shaped object;

discharging the deposition material which is an ink by an inkjet head, and discharging the fluid material from the inkjet head;

providing the inkjet head with a planarizing roller for planarizing the deposition material, and the planarizing roller removes excess of the fluid material from the clearance during the shaping; and storing the fluid material between the wall part and the shaped object being shaped, when the fluid material overflows from the clearance.

4. The manufacturing method for a shaped object according to claim 3, further comprising:

providing a support layer around the deposition material at the time of shaping the shaped object to support the deposition material, and the support layer being removed after the shaping, the removal of the support layer is performed after the wall part is removed, after the shaping of the shaped object is completed.

* * * * *